(12) United States Patent
Rosell

(10) Patent No.: US 12,384,591 B2
(45) Date of Patent: Aug. 12, 2025

(54) PACKAGE

(71) Applicant: BERRY SUPERFOS RANDERS A/S, Taastrup (DK)

(72) Inventor: Johan Rosell, Mullsjö (SE)

(73) Assignee: BERRY SUPERFOS RANDERS A/S, Taastrup (DK)

( * ) Notice: Subject to any disclaimer, the term of this patent is extended or adjusted under 35 U.S.C. 154(b) by 17 days.

(21) Appl. No.: 17/919,792

(22) PCT Filed: Apr. 19, 2021

(86) PCT No.: PCT/EP2021/060139
§ 371 (c)(1),
(2) Date: Oct. 19, 2022

(87) PCT Pub. No.: WO2021/214002
PCT Pub. Date: Oct. 28, 2021

(65) Prior Publication Data
US 2023/0150713 A1    May 18, 2023

(30) Foreign Application Priority Data

| Apr. 20, 2020 | (GB) | 2005709 |
| Aug. 31, 2020 | (WO) | PCT/EP2020/074254 |
| Dec. 14, 2020 | (GB) | 2019653 |

(51) Int. Cl.
*B65D 3/10* (2006.01)
*B29C 45/14* (2006.01)
(Continued)

(52) U.S. Cl.
CPC .......... *B65D 3/10* (2013.01); *B29C 45/14467* (2013.01); *B65D 3/06* (2013.01);
(Continued)

(58) Field of Classification Search
CPC . B65D 51/28; B65D 3/10; B65D 3/06; B65D 3/28; B65D 3/30; B29C 45/14467;
(Continued)

(56) References Cited

U.S. PATENT DOCUMENTS 3,931,385 A * 1/1976 Sutch ................ B29C 45/14475
264/154
3,931,908 A    1/1976 Cheyney
(Continued)

FOREIGN PATENT DOCUMENTS

CA    2499766 C * 1/2007 ............. A23G 9/503
EP    0481090 A1 * 4/1992
(Continued)

OTHER PUBLICATIONS

International Search Report and Written Opinion for PCT/EP2021/060139 dated Aug. 11, 2021.
(Continued)

*Primary Examiner* — Nathan J Newhouse
*Assistant Examiner* — Phillip D Schmidt
(74) *Attorney, Agent, or Firm* — Barnes & Thornburg LLP

(57) ABSTRACT

A hybrid package (10) is provided and comprises a wall (20) formed from a paper or paper-based material and a frame (15) formed from a plastics material. The frame (15) includes a step which is positioned against a free edge of the wall, whereby one or more exposed edges of the wall are protected by the frame.

24 Claims, 35 Drawing Sheets

(51) Int. Cl.
*B65D 3/06* (2006.01)
*B65D 3/30* (2006.01)
*B65D 43/02* (2006.01)

(52) U.S. Cl.
CPC .......... *B65D 3/30* (2013.01); *B65D 43/0204* (2013.01); *B65D 2543/00314* (2013.01)

(58) Field of Classification Search
CPC ........ B29C 45/14475; B29C 45/14778; B29C 2045/14473
USPC .......... 229/400, 4.5, 403, 406; 264/267, 268
See application file for complete search history.

(56) References Cited

U.S. PATENT DOCUMENTS

| | | | | |
|---|---|---|---|---|
| 4,001,471 | A | * | 1/1977 | Rumball ................ B65D 5/209 428/81 |
| 4,020,140 | A | * | 4/1977 | Rumball ........... B29C 45/14475 264/261 |
| 4,123,214 | A | * | 10/1978 | Sutch ................ B29C 45/14475 249/91 |
| 4,993,623 | A | * | 2/1991 | Kelly ..................... B65D 15/08 229/110 |
| 7,481,356 | B2 | * | 1/2009 | Stahlecker ............... B65D 3/06 206/520 |
| 7,665,627 | B2 | * | 2/2010 | Shibata .................... B65D 3/06 220/703 |
| 9,302,832 | B2 | * | 4/2016 | Park ....................... B65D 15/08 |
| 10,589,890 | B2 | | 3/2020 | Nille |
| 2001/0038014 | A1 | | 11/2001 | Donelson |
| 2003/0106895 | A1 | | 6/2003 | Kalal |
| 2004/0013830 | A1 | | 1/2004 | Nonomura |
| 2009/0220711 | A1 | | 9/2009 | Chang |
| 2010/0230424 | A1 | | 9/2010 | Bartlett |
| 2012/0261464 | A1 | * | 10/2012 | Hung ................ B29C 45/14688 264/478 |
| 2014/0353202 | A1 | * | 12/2014 | Park ....................... B65D 15/08 206/524.6 |
| 2021/0120988 | A1 | | 4/2021 | Leser |
| 2021/0261464 | A1 | | 8/2021 | Kerr |

FOREIGN PATENT DOCUMENTS

| | | | | |
|---|---|---|---|---|
| EP | 1650134 | | 4/2006 | |
| EP | 1650134 | A2 * | 4/2006 | ....... B29C 45/14475 |
| EP | 2213350 | | 8/2010 | |
| EP | 2420374 | | 2/2012 | |
| GB | 1348370 | | 3/1974 | |
| JP | H1058482 | A * | 3/1998 | |
| WO | 2011131653 | A1 | 10/2011 | |

OTHER PUBLICATIONS

International (PCT) Search Report for International (PCT) App. No. PCT/US2024/027707 dated 09 Sep. 2024, BP-611 PCT II 16 pages.
International Search Report and Written Opinion for PCT/EP2020/074254 dated Feb. 9, 2021.
International Preliminary Report on Patentability for PCT/EP2020/074254 dated Jul. 12, 2022.
Office Action (Non-Final Rejection) dated Feb. 26, 2024 for U.S. Appl. No. 17/919,795 (pp. 1-9).

* cited by examiner

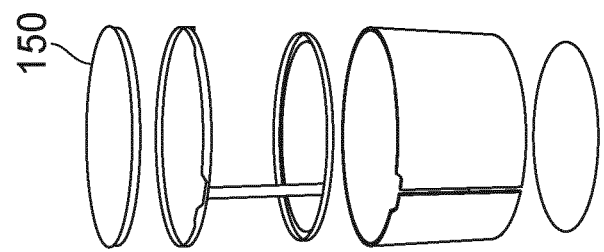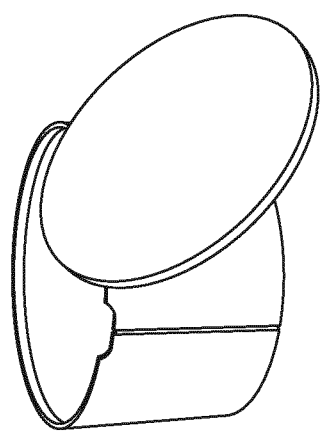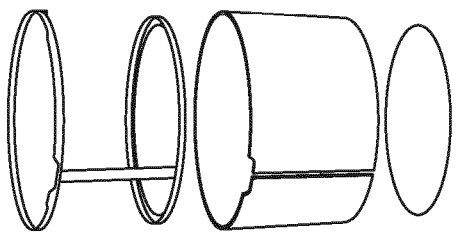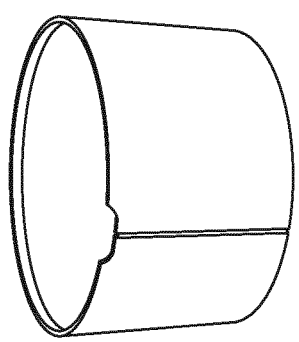
FIG. 10
FIG. 9

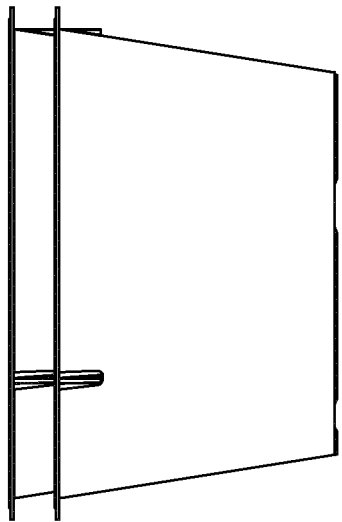
FIG. 16
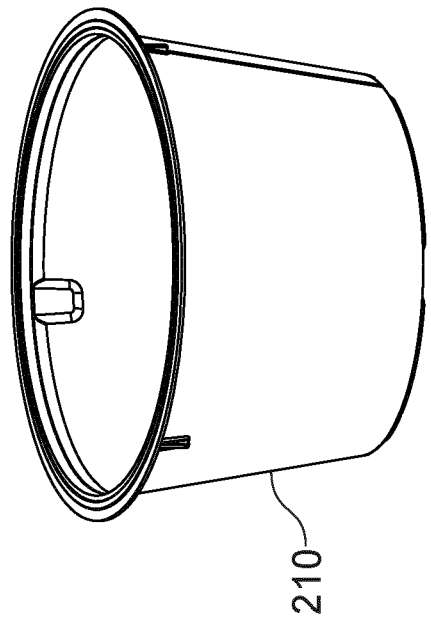
FIG. 15
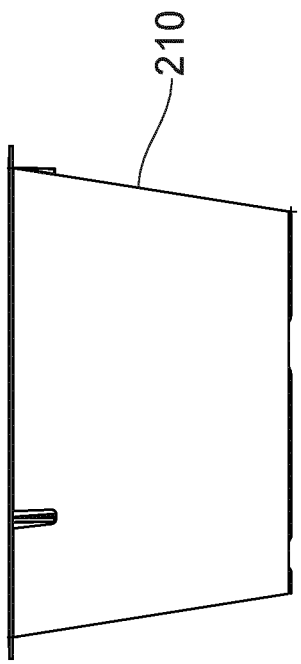
FIG. 13
FIG. 14

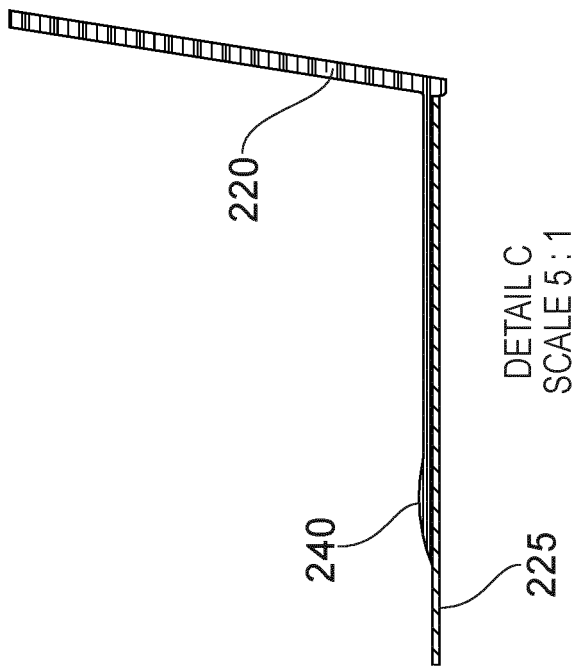
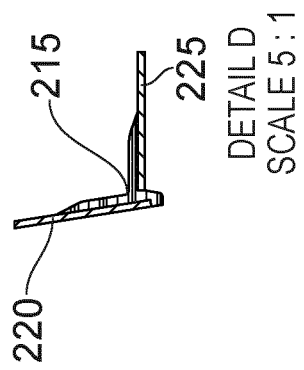
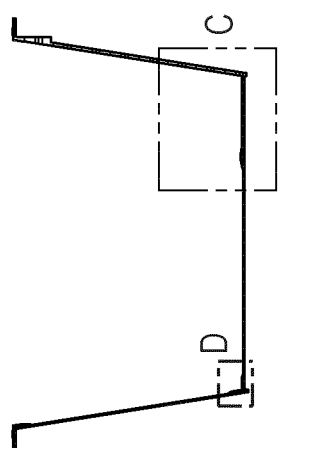
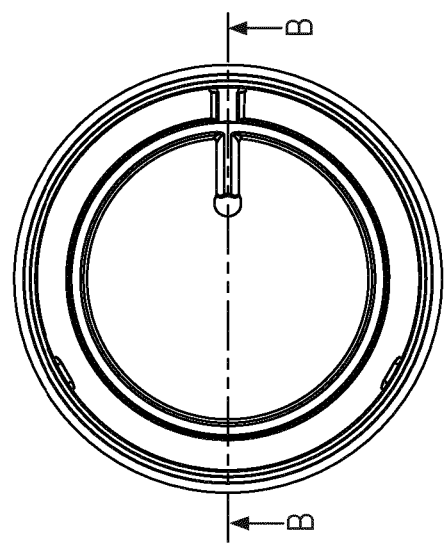

DETAIL C
SCALE 5:1

510

DETAIL B
SCALE 5:1

510

510

510
SECTION A-A

DETAIL D
SCALE 5 : 2

DETAIL E
SCALE 5 : 2

SECTION B-B

SECTION C-C

710

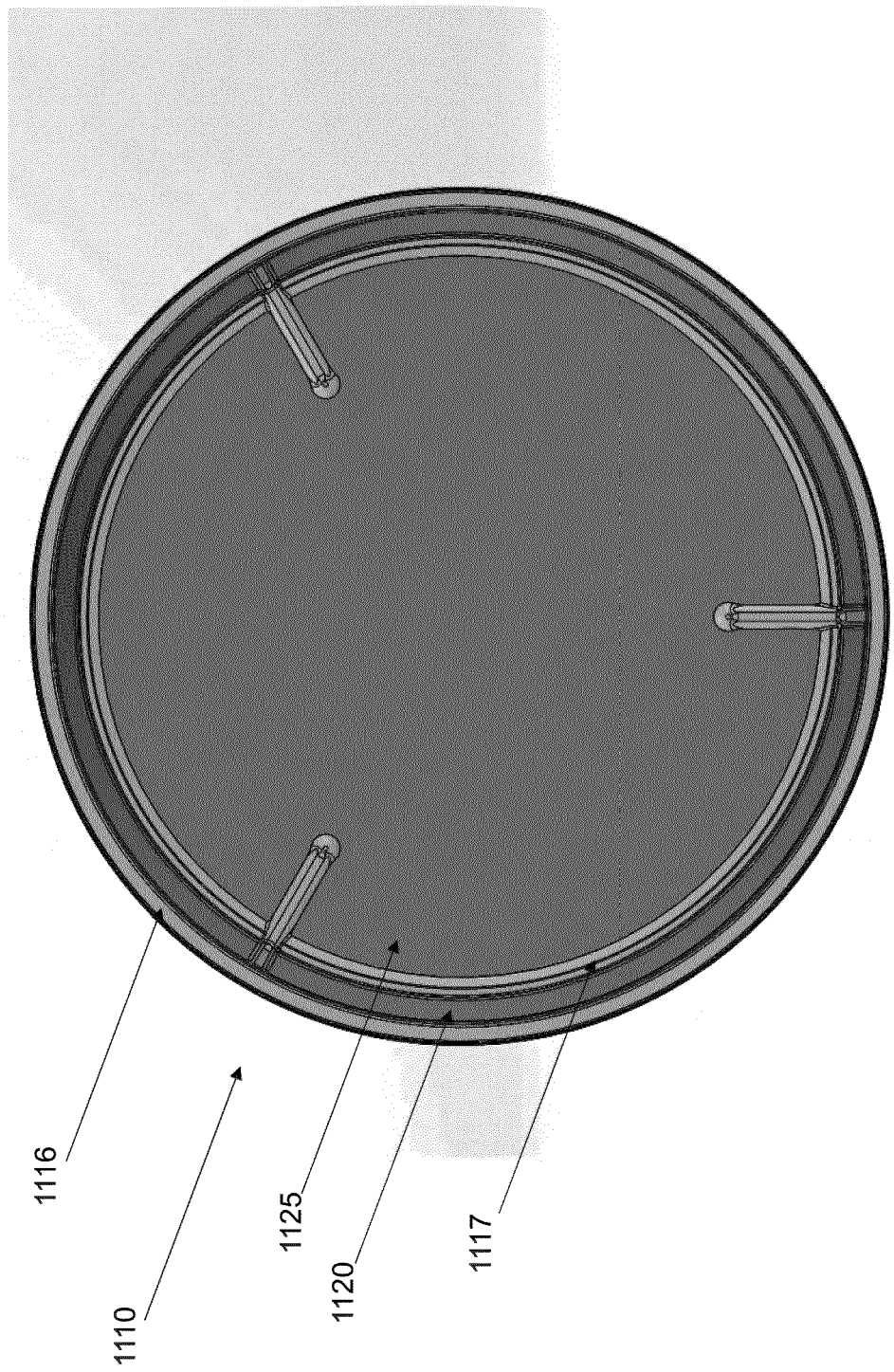

PACKAGE

CROSS REFERENCE TO RELATED APPLICATIONS

This application is a U.S. national stage application under 35 U.S.C. § 371(b) of International Application No. PCT/EP2021/060139 filed Apr. 19, 2021, which claims priority to the United Kingdom Patent Application No. 2005709.7 filed on Apr. 20, 2020, PCT International Application No. PCT/EP2020/074254 filed on Aug. 31, 2020, and United Kingdom Patent Application No. 2019653.1 filed Dec. 14, 2020, the disclosures of each are hereby expressly incorporated by reference in their entirety.

The present invention relates generally to packaging and particularly, although not exclusively, to a hybrid material package such as a jar, pot, cup, tub or the like.

Use of more than one different type of material can be used to create packaging with multiple benefits, including benefits for performance and environmental impact.

The present invention seeks to provide improvements in or relating to packaging.

An aspect of the present invention provides a package comprising a frame formed from a plastics material and a wall formed from a paper or paper-based material.

This aspect therefore allows for the incorporation of paper into packaging.

The frame may be formed from a polyolefin polymer such as polypropylene.

An aspect of the present invention provides a package comprising a frame formed from a plastics material and a wall formed from a fibre-based material.

An aspect of the present invention provides a package comprising a frame formed from a plastics material and a wall formed from a non-woven material.

An aspect of the present invention provides a hybrid package comprising a wall formed from a paper or paper-based material and a frame formed from a plastics material, in which the frame includes a step which is positioned against a free edge of the wall, whereby one or more exposed edges of the wall are protected by the frame.

In some embodiments all exposed edges of the wall are covered by the frame i.e. there is substantially no part of the edge of the wall which is exposed. This could be particularly useful, for example, for parts of the wall likely to come into contact with surfaces (e.g. at or towards the bottom of a package), where preventing exposed edges coming into direct contact with a surface can prevent moisture entry and ingress into the paper material.

In some embodiments a step is provided in the region of a frame corner.

Paper components of a package (e.g. the wall) may be provided as a blank which is cut, stamped or otherwise formed from a stock. This could result in exposed edges, which may be particularly susceptible to moisture entry.

The wall may, for example, be formed from paperboard or cardboard which may be lined or coated with plastic or wax. The paperboard/cardboard may be a laminate, for example including one or more layers of plastics material such as polypropylene. Whilst the major surfaces of the wall would, for example, be coated, if the wall is cut/stamped from a stock/blanket the exposed edges would not have this coating.

The wall may be formed as side sleeve/wrap/wall.

The package may further comprise a base, which may be formed separately from the wall. The base may be assembled during or after formation of a frame/wall subassembly.

The base may comprise paper or paper-based material and/or plastic material. In some embodiments a disc-like paperboard base is provided.

The package may comprise a lid. The lid may comprise paper or paper-based material and/or plastics material. In some embodiments the lid is formed from just plastics material. In some embodiments the lid is a hybrid material part such as a plastics/paperboard composite, for example formed by a sequential moulding process.

The frame (for example a lower ring) may include a foot on which the package rests in use. This can be useful during post-forming operations (such as filling) and in subsequent customer use to protect a paperboard base. The base is therefore at least slightly sunken from the bottom end of the frame so that it is raised from a surface when the package stands on the frame.

The foot may include one or more steps/ridges/ribs onto/against which a base may be received (for example being dropped in from above or pushed in from below).

In some embodiments a wall is overmoulded (for example injection moulded) onto a frame.

The frame may be formed using an off-centre injection point e.g. offset from a generally central axis of the frame.

The frame may be formed with an upper ring and a lower ring. The rings may be joined by a stem.

Part of the frame, for example a lower ring, may include an (e.g. radially) inwardly extending part that allows formation using an off-centre injection point.

The upper ring may have a larger diameter than the lower ring. In plan the rings may be concentric (i.e. share the same central axis). An axially inclined stem may join the rings together. Either or both rings may be substantially circular. Other shapes/forms of the package are envisaged, including, for example, generally square, generally oval, generally elliptical, generally rectangular.

The wall may be generally frustoconical when assembled onto the frame.

The wall (e.g. sidewall) may be formed as a flat blank that is foldable into a final form. The blank may be folded only in a single plane.

A further aspect provides a mixed material package comprising an injection moulded polypropylene skeleton and a paperboard sleeve.

A package formed in accordance with the present invention may, for example, be a cup, pot, tub or a jar.

A further aspect provides a method of forming a package comprising: providing a wall formed from a paper or paper-based material; inserting the wall into a mould; and injection overmoulding a frame onto the wall.

The mould may be configured such that when closed it presses onto the wall to define a boundary (for example a seal) for subsequent material flow during overmoulding.

In some embodiments a base is also inserted into the mould. The subsequent injection of the frame may join/link the base and wall together.

The material for the frame may be injected using an off-centre gate. The mould may be provided with a cavity that will form a projecting/extending limb on the frame which can serve as an injection gate.

The method may comprise the step of forming the wall from a stock with a consequence that exposed edges are formed, and the step of covering the exposed edges with the frame material.

A further aspect of the present invention provides a package comprising a tub including a tub frame formed from a plastics material and a tub wall formed from a paper or paper-based material, and a lid including a lid frame formed from a plastics material and a lid wall formed from a paper or paper-based material.

Some aspects allow for the incorporation of paper into packaging.

The tub and/or lid frame may be formed from a polyolefin polymer such as polypropylene.

The tub and/or lid wall may, for example, be formed from paperboard or cardboard which may be lined or coated with plastic or wax. The paperboard/cardboard may be a laminate, for example including one or more layers of plastics material such as polypropylene.

The tub wall may be formed as side sleeve/wrap/wall.

The package further comprises a tub base, which may be formed separately from the wall. The base may be assembled during or after formation of a frame/wall sub-assembly.

The base may comprise paper or paper-based material and/or plastic material. In some embodiments a disc-like paperboard base is provided.

In some embodiments the lid is a hybrid material part such as a plastics/paperboard composite, for example formed by a sequential moulding process.

The lid may, for example, be formed as a snap on lid.

The package may, for example, be two components: a tub and a lid. In other embodiments a separate top rim may be provided to create the connection to a lid.

The lid may be formed as two components, either or both of which may be formed from a "skeleton" frame and a paper insert.

A lid may be formed with a paper board on a flat surface and then injection moulded the connection features to get the connection between tub and the two lids.

The tub may comprise a paperboard wall connected with a polypropylene skeleton.

At the top of the tub there may be a standing edge for a snap on lid.

An aspect of the present invention provides a package comprising a tub and a lid, the tub including a tub frame formed from a plastics material and a tub wall formed from a paper or paper-based material, the lid comprises a connecting part and a cap part, the connecting part connects to the tub and the cap connects to the connecting part.

The connecting part may include a frame (e.g. formed from plastics material) and a wall (e.g. formed from a paper or paper-based material).

The cap may include a frame (e.g. formed from plastics material) and a wall (e.g. formed from a paper or paper-based material).

The connecting part may snap fit onto the tub. The cap may snap fit onto the connecting part.

In some embodiments one or more components are formed using an injection moulding process e.g. with a wall inserted into a mould cavity and then plastics material injected into the cavity to form a skeleton over/on/against the wall.

The material for a frame may be injected using an off-centre gate. A mould may be provided with a cavity that will form a projecting/extending limb on a frame which can serve as an injection gate.

The lid of some embodiments may comprise a polypropylene frame and a paperboard deck.

Packages provides with a lid may further comprises a sub-lid which is attached or attachable to the lid. A void may be formed between the lid and the sub-lid. The sub-lid may be a snap-fit into/onto the lid. Other forms of engagement, such as screw threads, may be provided.

In some aspects and embodiments of the present invention only a single injection inlet point is used for a frame. In other aspects and embodiments multiple inlets are used.

The present invention also provides a wraparound sidewall blank for a hybrid package. The blank is removed (e.g. cut/stamped/punched) from a stock sheet of fibre-based material. As a result the orientation of the fibres can be controlled (for example to be all substantially the same). It will be appreciated that if the sidewall is formed only by bending in a single plane, the uni-directional orientation of the fibres will be maintained in the final hybrid package. This means, for example, that the fibres can be oriented to provide a particular benefit. In some embodiments the sidewall fibres have a generally axial orientation, meaning that maximum stiffness is provided in a top load direction.

In some aspects and embodiments the frame includes first and second parts (e.g. upper and lower rings). The parts may be joined only by a single channel/stem; or multiple stems may be provided.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims. Each aspect can be carried out independently of the other aspects or in combination with one or more of the other aspects.

The present invention will now be more particularly described, by way of example, with reference to the accompanying drawings.

Example embodiments are shown and described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The invention is not limited in the design and shape of the structure shown in the drawings.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Referring now to FIG. 1 there is shown a package generally indicated 10. The exploded view shows the package 10 to comprise a frame 15, a wraparound sidewall 20 and a base 25.

The frame comprises an upper ring 16 and a lower ring 17 which are axially spaced and joined by an inclined stem/tether 18. The upper ring includes depending tab which in use form around notches formed in the sidewall.

FIG. 2 shows a partial section of the paperboard material used in this embodiment for the sidewall 20 and the base 25.

FIGS. 3 and 4 illustrates the lower ring 17 and shows that at its "bottom" face (i.e. the face on which the package will rest in use) a foot is formed by arcuate feet portions 18. The portions 18 are spaced by radially inwardly extending rims 19 on which the base 25 rests in the package. The foot protects the paperboard base against damage (wear and water damage) during filling and subsequent usage.

FIG. 5 shows a blank used to form the sidewall 20. A punch line is shown in solid line. The blank is generally arcuate and includes two notches 22.

FIG. 6 shows a blank used to form the base 25. A punch line is shown in solid line.

FIGS. 7 and 8 relate to an overmoulding process used to form a package of the type described in relation to FIGS. 1 to 6.

In this embodiment a package is formed by first taking a wall blank of the type shown in FIG. 5 and a base blank of the type shown in FIG. 6. The blanks are placed in female mould cavities (eight separate cavities are shown by way of example in FIG. 8).

Illustrated in FIG. 7 is: the areas 35 into which plastics material flows; the paperboard blanks 37; and areas 39 of paperboard that are compressed/under pre-tension when the male part of the mould is closed onto the female part.

When the tool is closed, the paper is compressed on well-chosen surfaces to ensure that the plastic does not extend over it in an overmoulding step. The board does not take up the entire mould; the room that remains is filled with polypropylene, so the plastics skeleton is fused to the paper carton and becomes a structural member of the product.

Also illustrated in FIG. 7 is a single limb 40 which extends radially inwardly from the lower ring of the frame. The free end 41 of the limb 40 is the gate point of the mould. In this embodiment this means an injection point approximately 17 mm off centre. Also shown are the tabs that depend from the upper ring.

FIG. 9 shows a package 110 formed according to a further embodiment in assembled and exploded views.

FIG. 10 shows a package 110 of the type shown in FIG. 9 and including a lid 150. The lid 150 is a push-fit/snap-fit into the upper ring of the frame.

In this embodiment the lid is formed from plastics materials. In other embodiments a mixed material lid is provided.

FIGS. 11 and 12 show perspective and side exploded views of a package formed according to a further embodiment. The formed package 210 is shown in FIGS. 13 to 15 and 17 to 20. Stacked packages are shown in FIG. 16.

Figure 1:
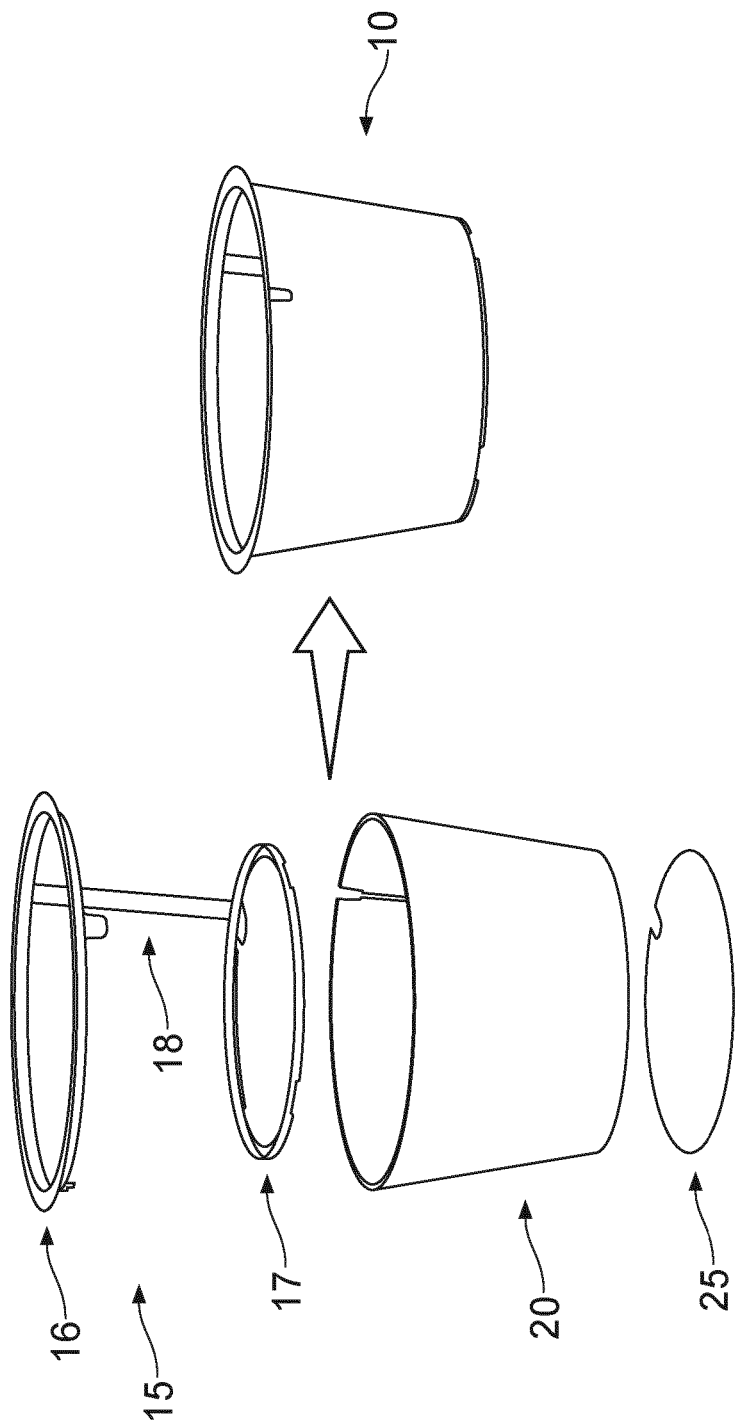
Figure 2:
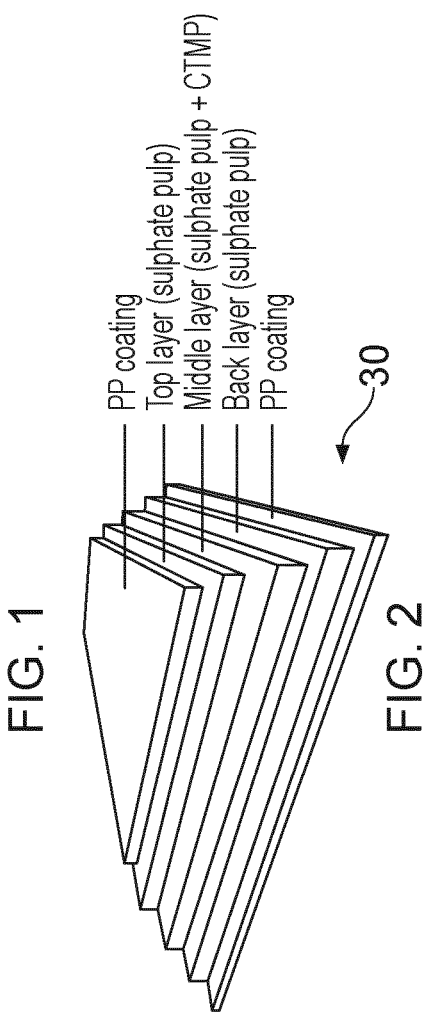
Figure 4:
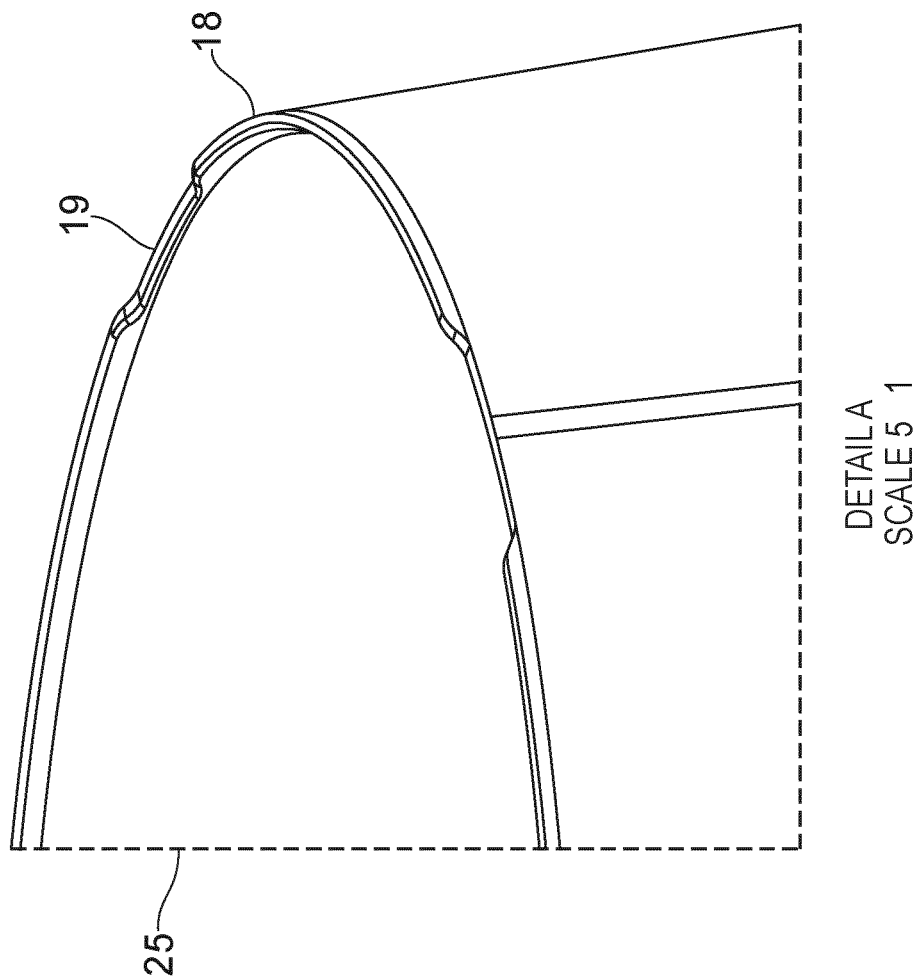
Figure 3:
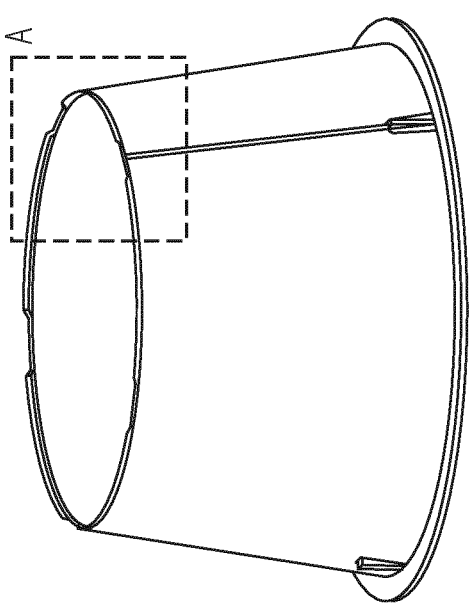
Figure 5:
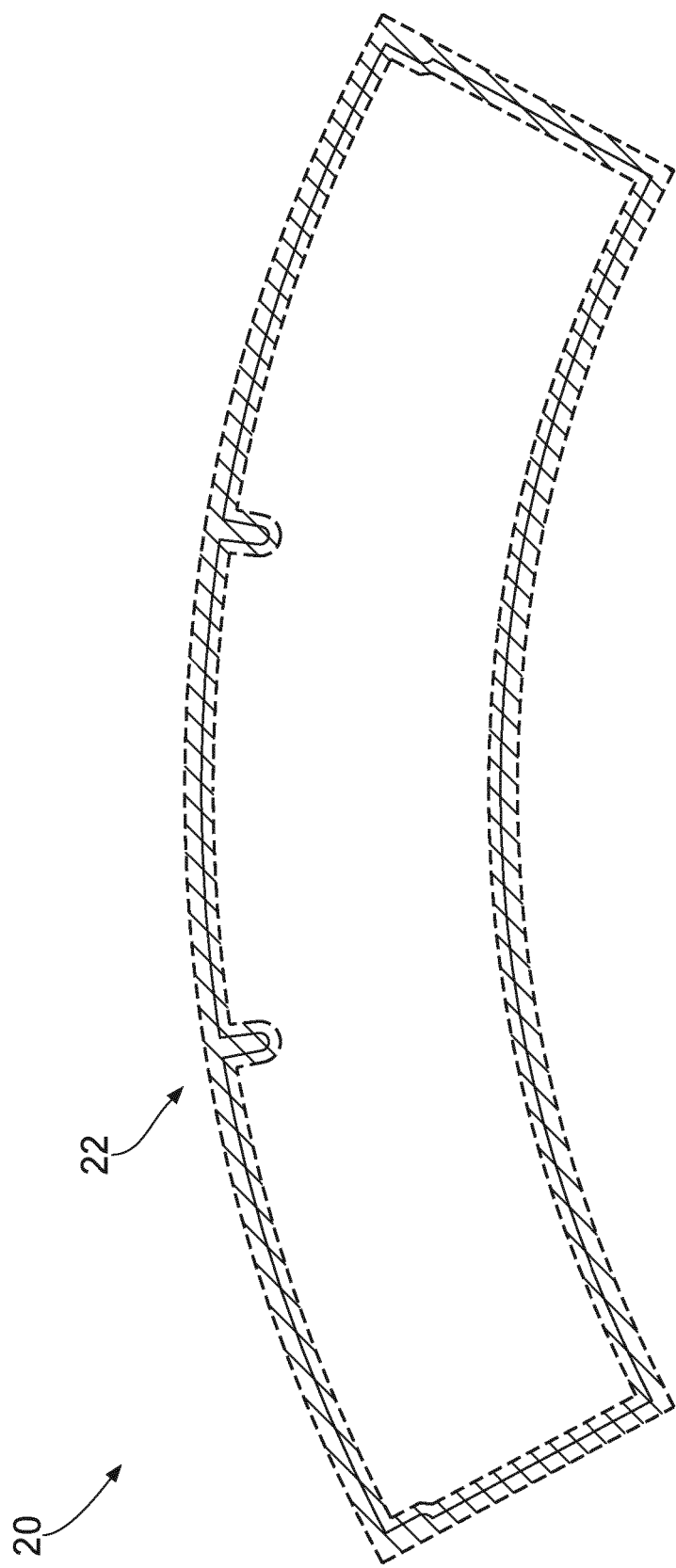
Figure 6:
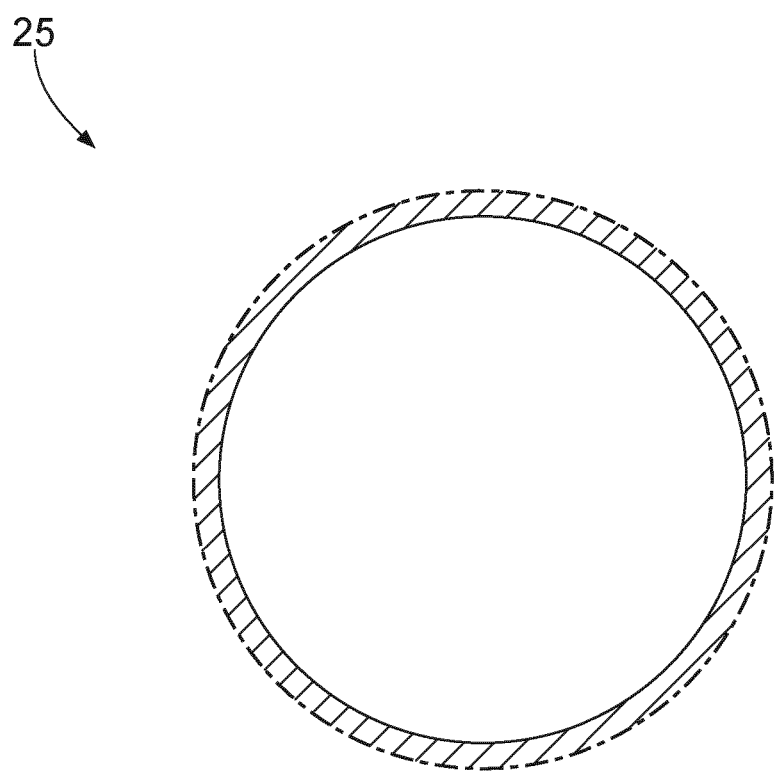
Figure 8:
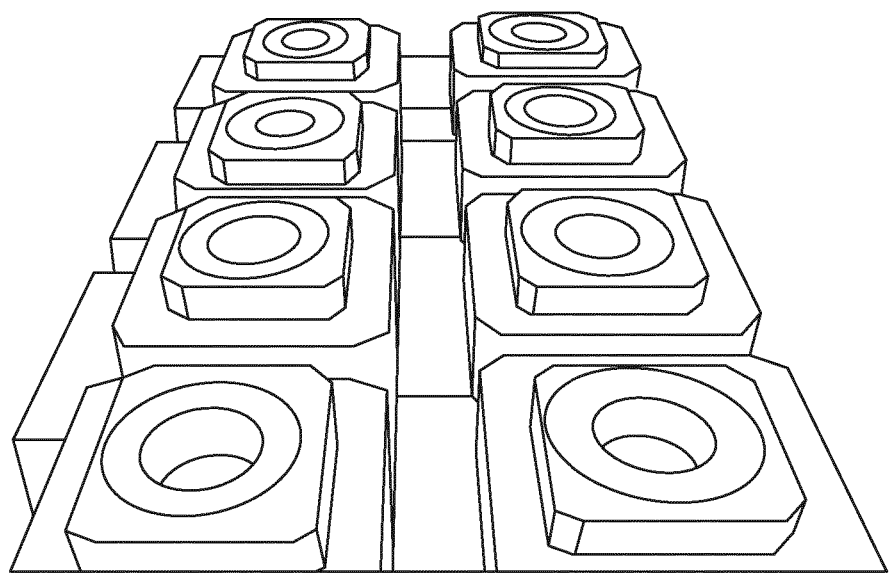
Figure 7:
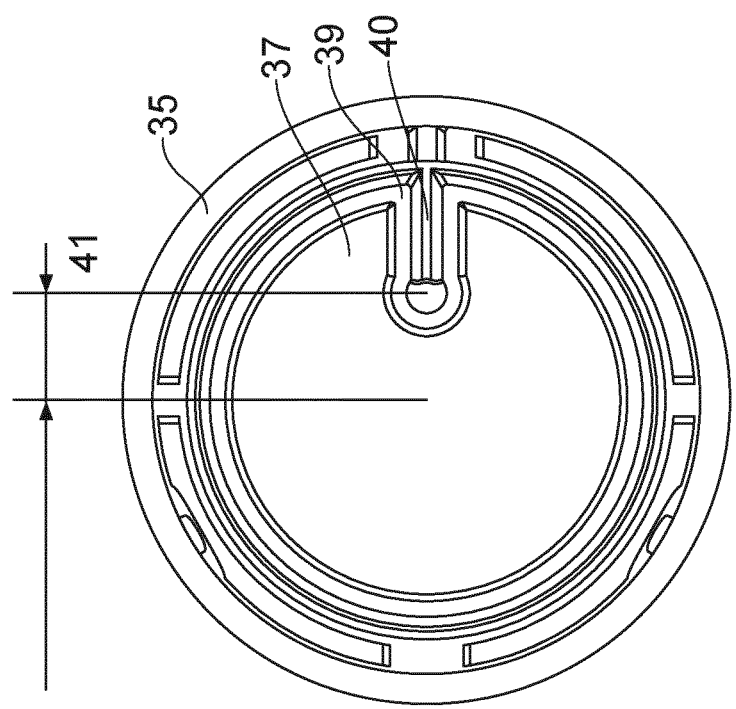
Figure 12:
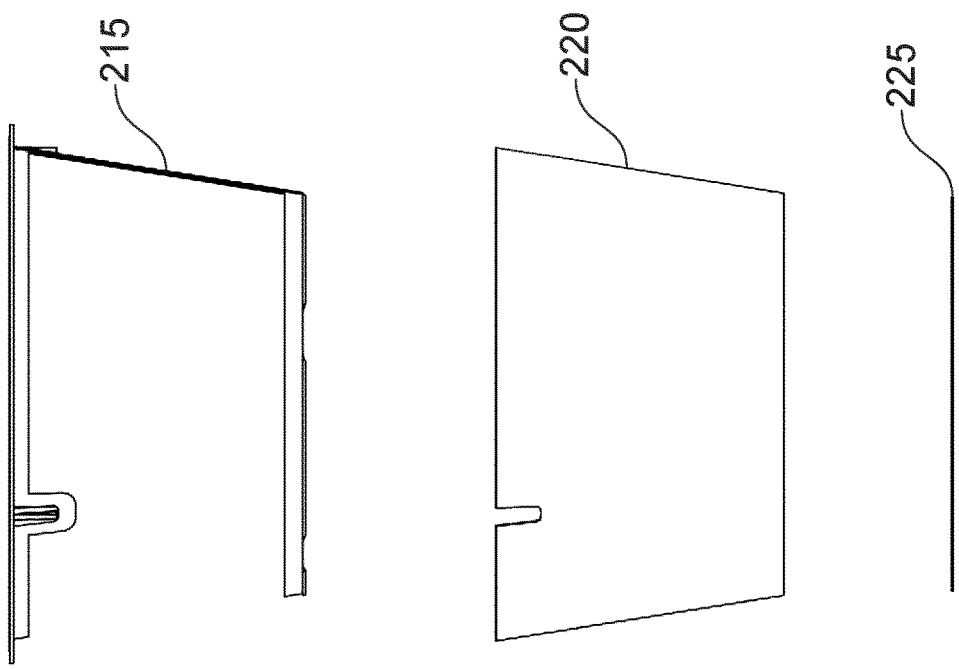
Figure 11:
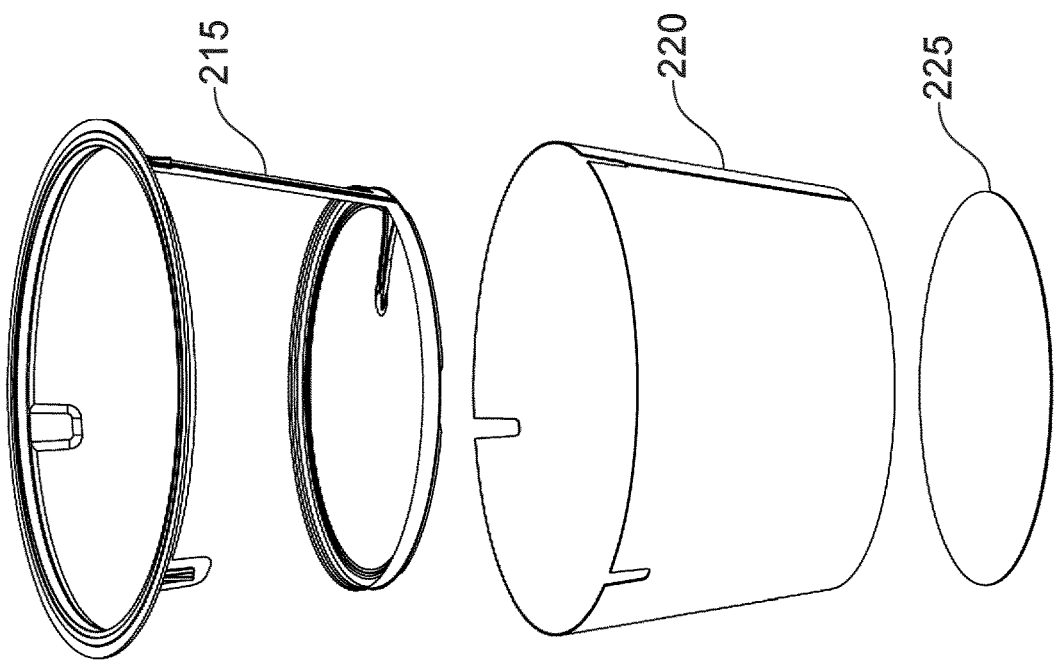
Figure 24:
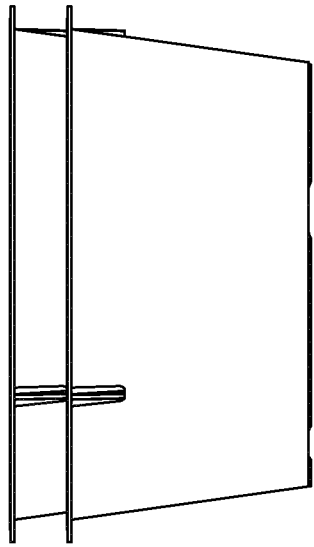
FIG. 24 shows two packages of the type shown in FIGS. 21 to 23 stacked one on top of the other.
Figure 23:
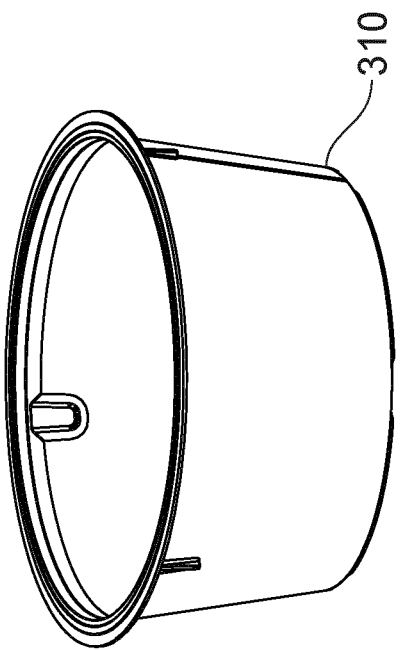
FIGS. 21 to 23 are side, plan and perspective views of a package 310 formed according to a further embodiment.
Figure 21:
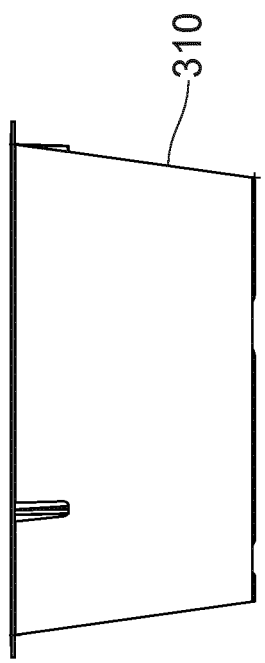
Figure 22:
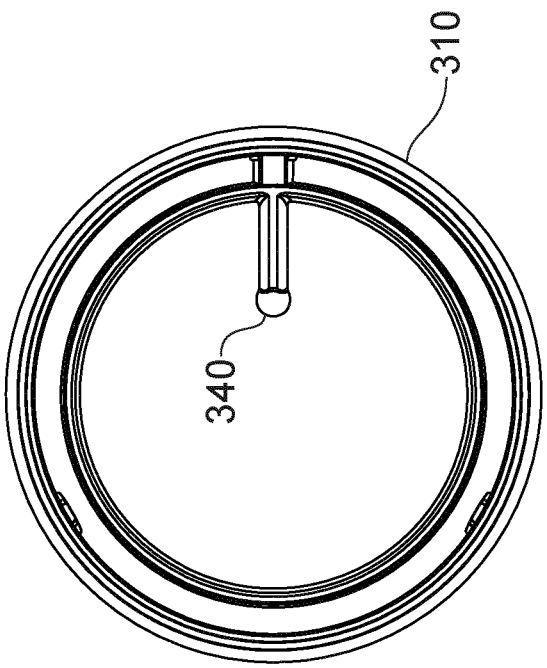
Figure 27:
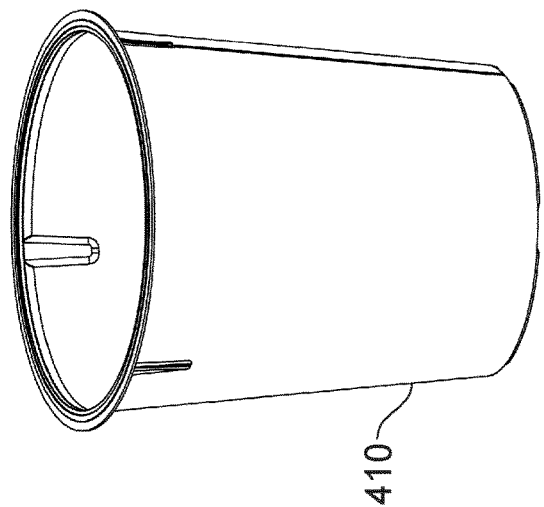
FIGS. 25 to 27 are side, plan and perspective views of a package 410 formed according to a further embodiment.
Figure 28:
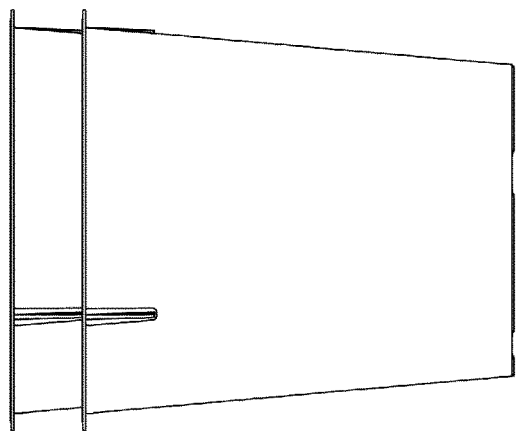
FIG. 28 shows two packages of the type shown in FIGS. 25 to 27 stacked one on top of the other.
Figure 25:
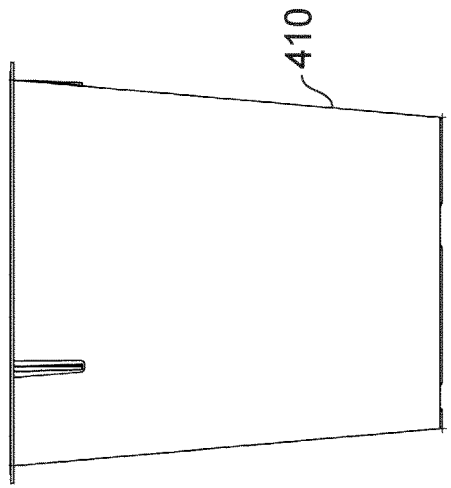
Figure 26:
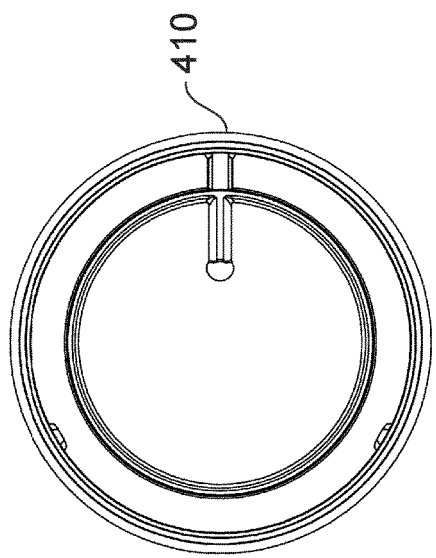
Figure 34:
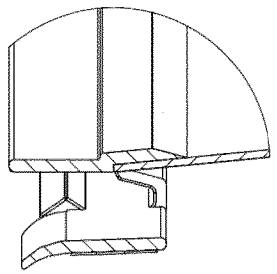
FIGS. 29 to 34 show a package 510 formed according to a further embodiment.
Figure 32:
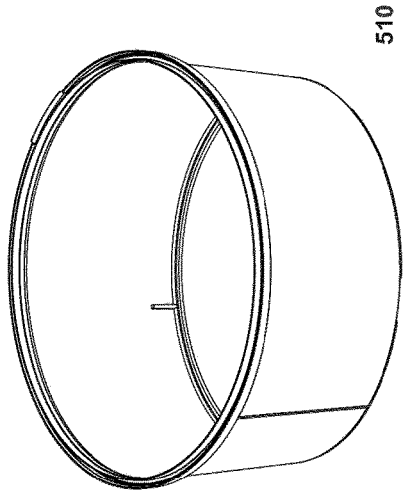
Figure 33:
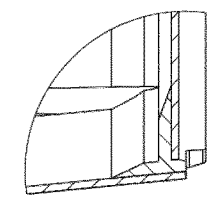
Figure 29:
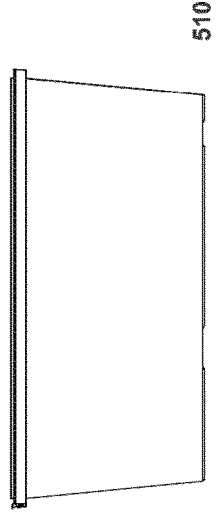
Figure 30:
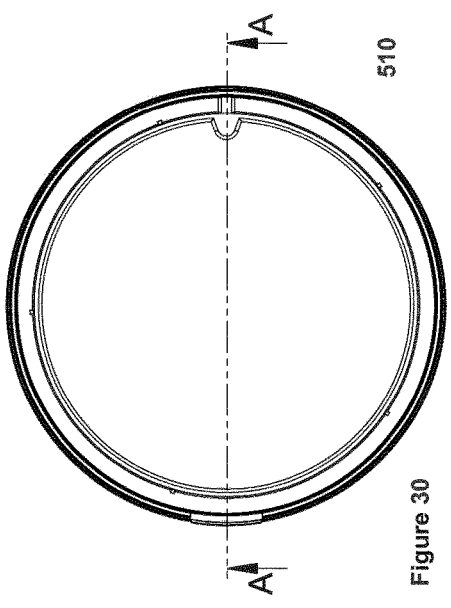
Figure 31:
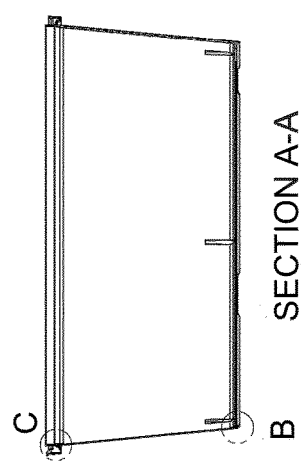
Figure 40:
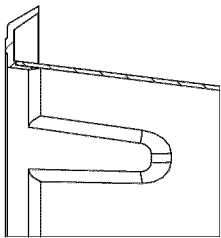
FIGS. 35 to 41 show a package 610 formed according to a further embodiment. In this embodiment the package is generally rectangular/cuboidal.
Figure 38:
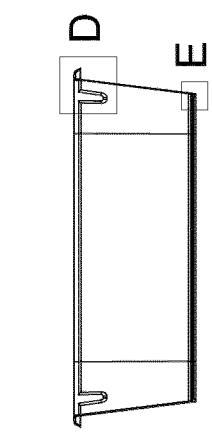
Figure 41:
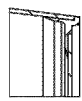
Figure 39:
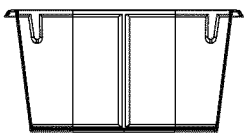
Figure 35:
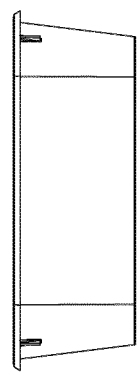
Figure 36:
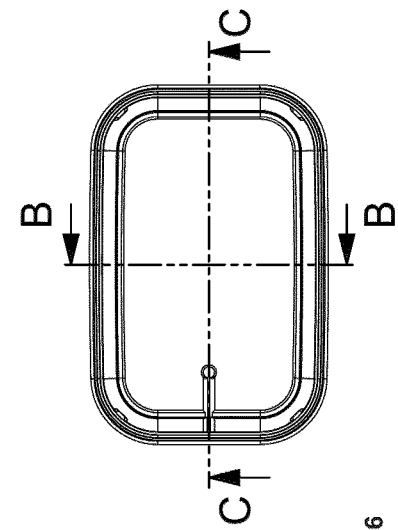
Figure 37:
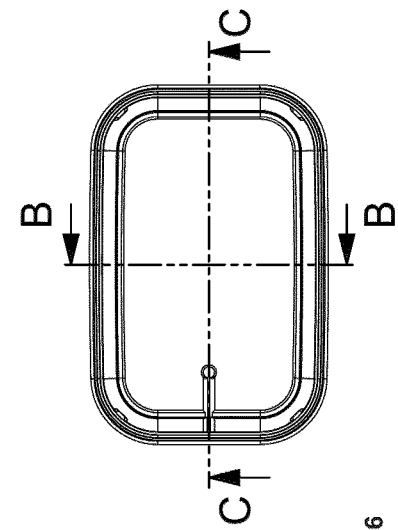
Figure 43:
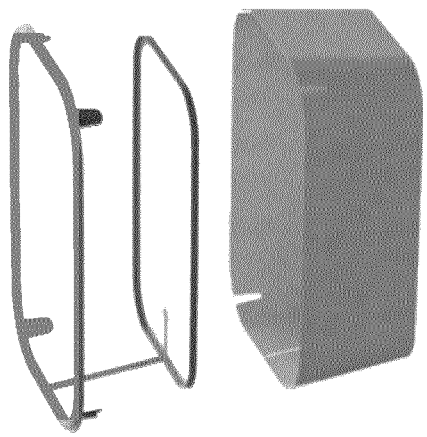
FIGS. 42 and 43 show a package 710 formed according to a further embodiment and shown in assembled and exploded views. The package is generally rectangular.
Figure 42:
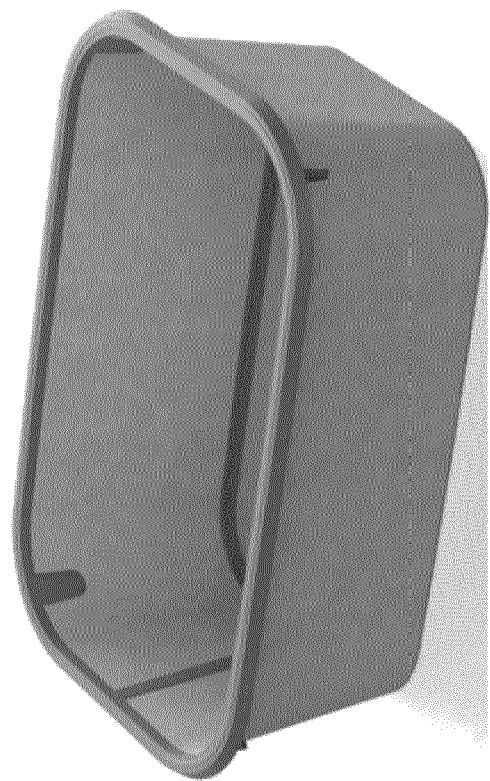
Figure 44:
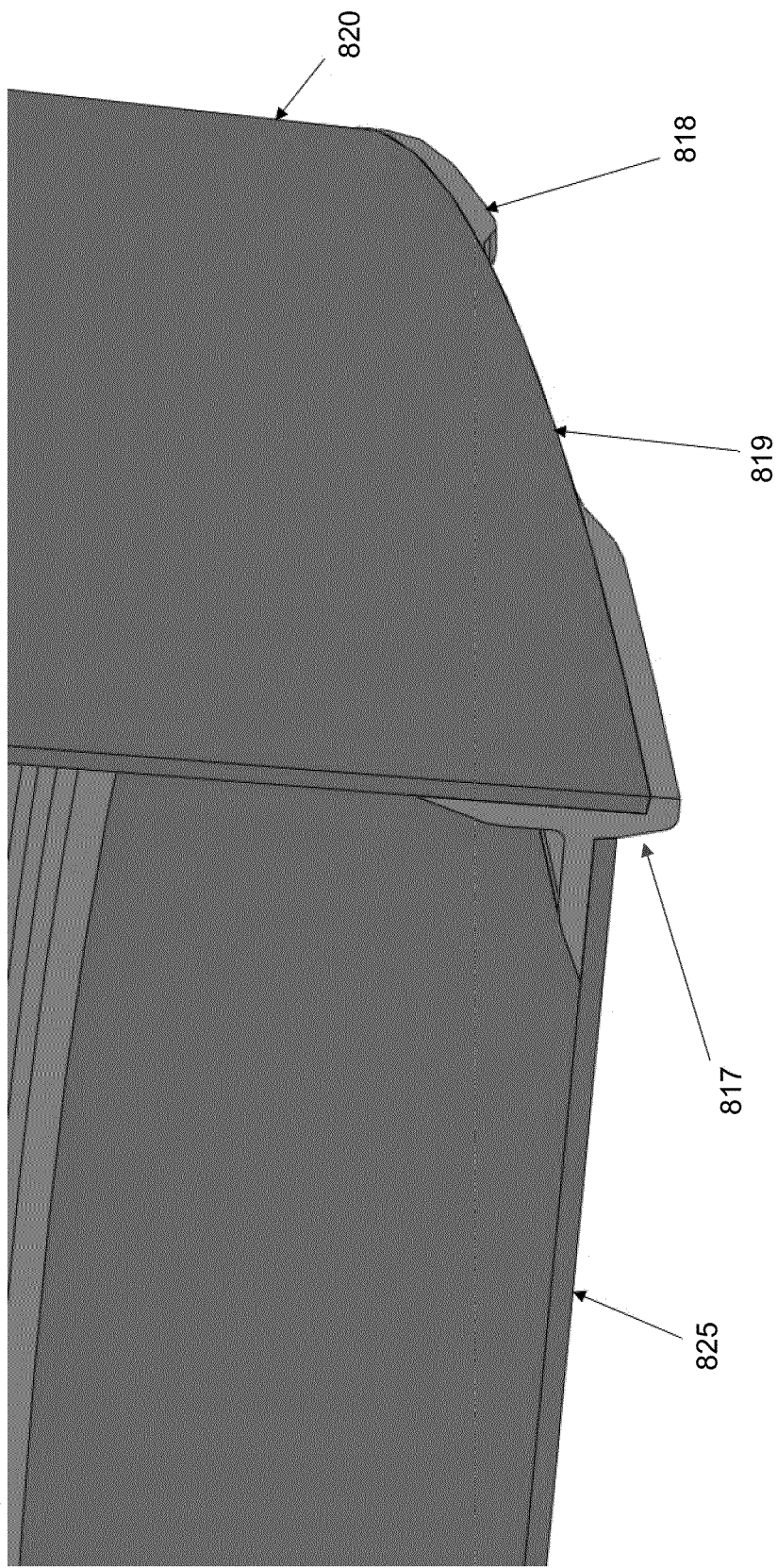
FIGS. 44 to 46 illustrate a corner region of a package 810.
Figure 45:
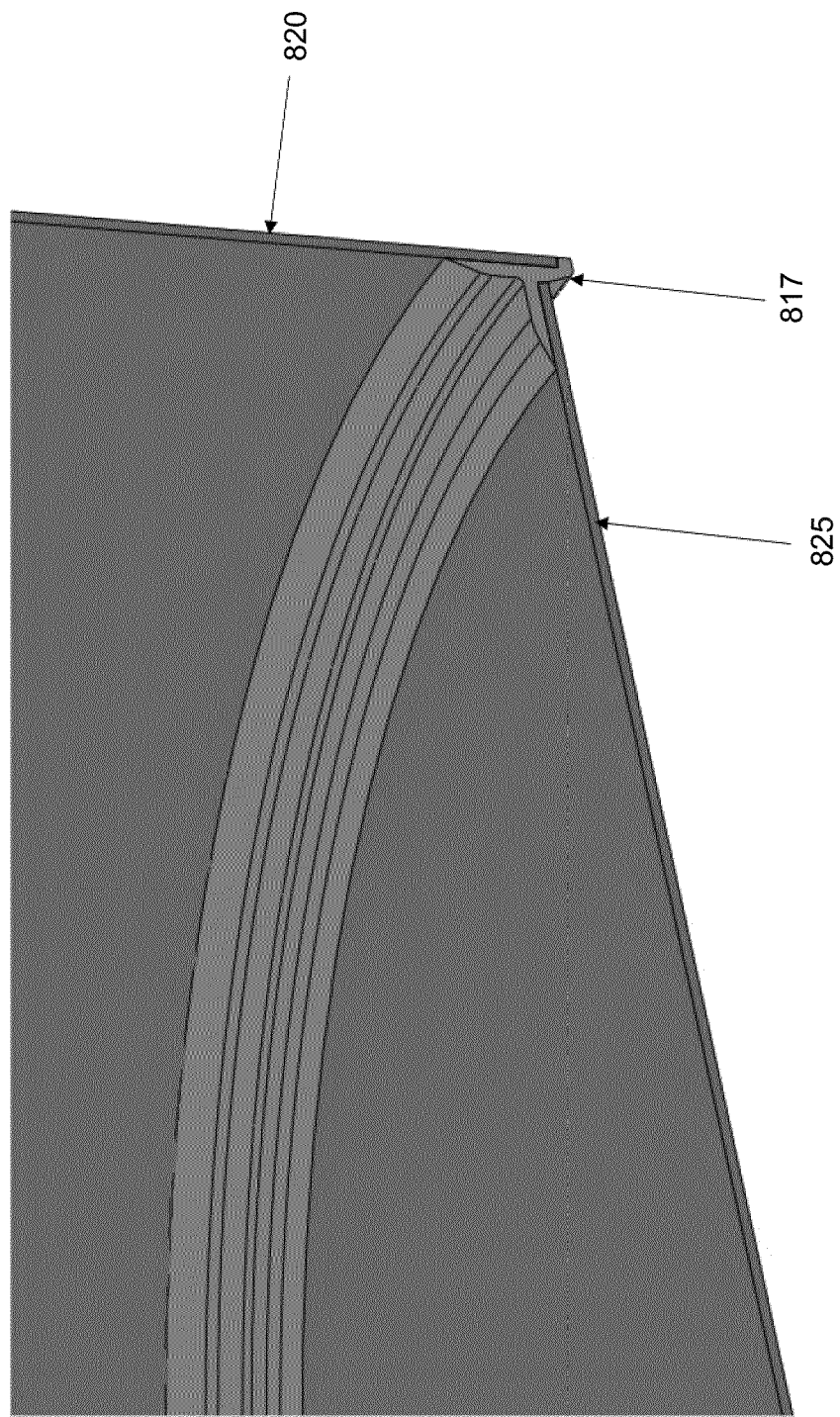

A ring 817 is shown, having a generally T-shape section. The section of the ring 817 includes an L-shape upper section 817a and an L-shape lower section 817b which depending from the corner of the upper section. A generally horizontal (in the drawing) leg of the upper section is formed against the base 825; a generally vertical leg of the upper section is formed against the sidewall 820. The base also abuts an inner surface of a longer leg of the lower section. The shorter leg of the lower section forms feet portions 818 and provide an outward step. It will be noted that the free end of the sidewall is formed against the step. It will also be noted that the plastic material only extends along the inner face of the sidewall; there is only plastic on one side and end.

Figure 46:
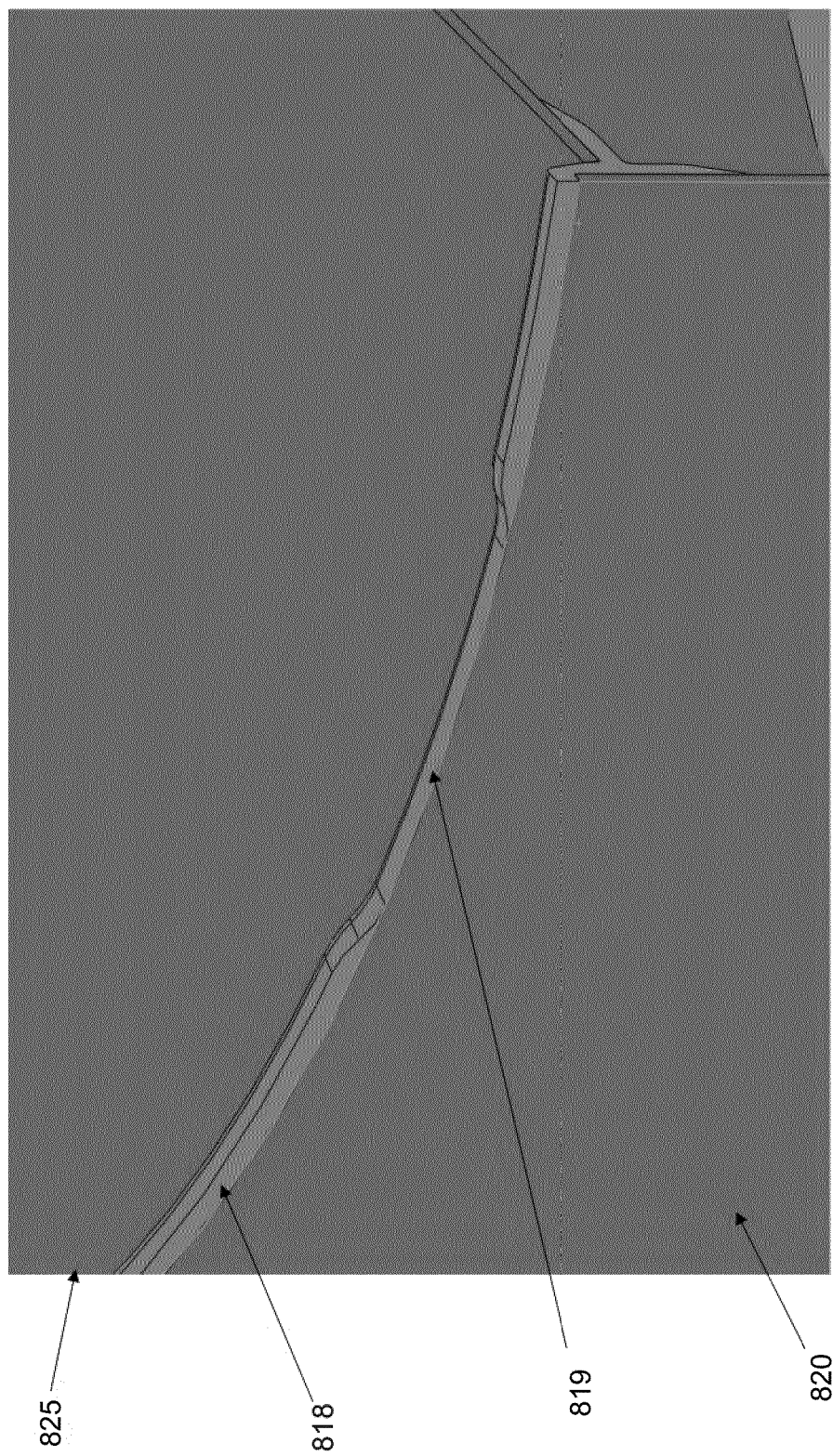
Figure 47:
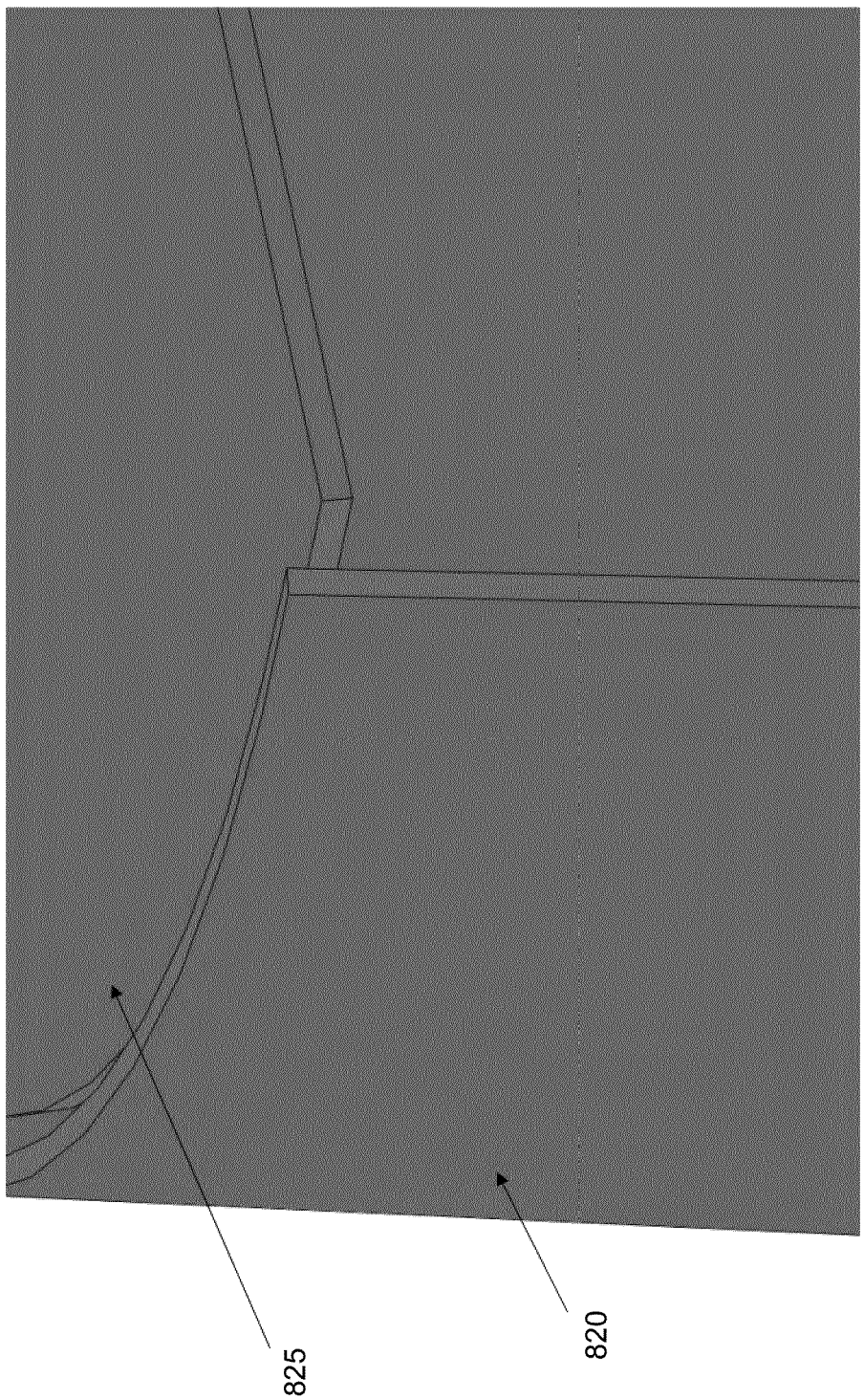

FIG. 46 shows that the plastics material is formed across all of the exposed edge of the sidewall, even across the gaps 819 (useful as an end point for labels, for example). For purposes of illustration, FIG. 47 shows the corner region but with the frame shown removed, so that the sidewall and base can be seen clearly, with their exposed edges being highlighted.

The foot protects the paperboard base and sidewall against damage (wear and water damage) during filling and subsequent usage. Exposed edges of the base and the sidewall are covered by material of the frame.

Figure 48:
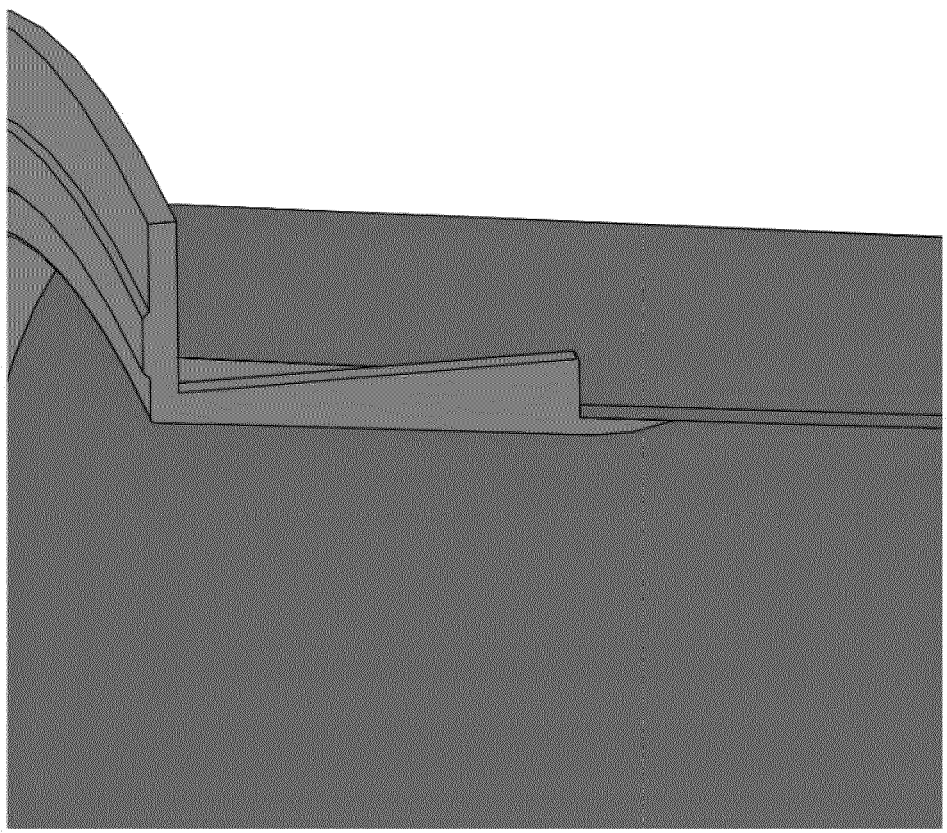

FIG. 48 shows the wraparound sidewall in the region where its two ends approach.

Figure 49:
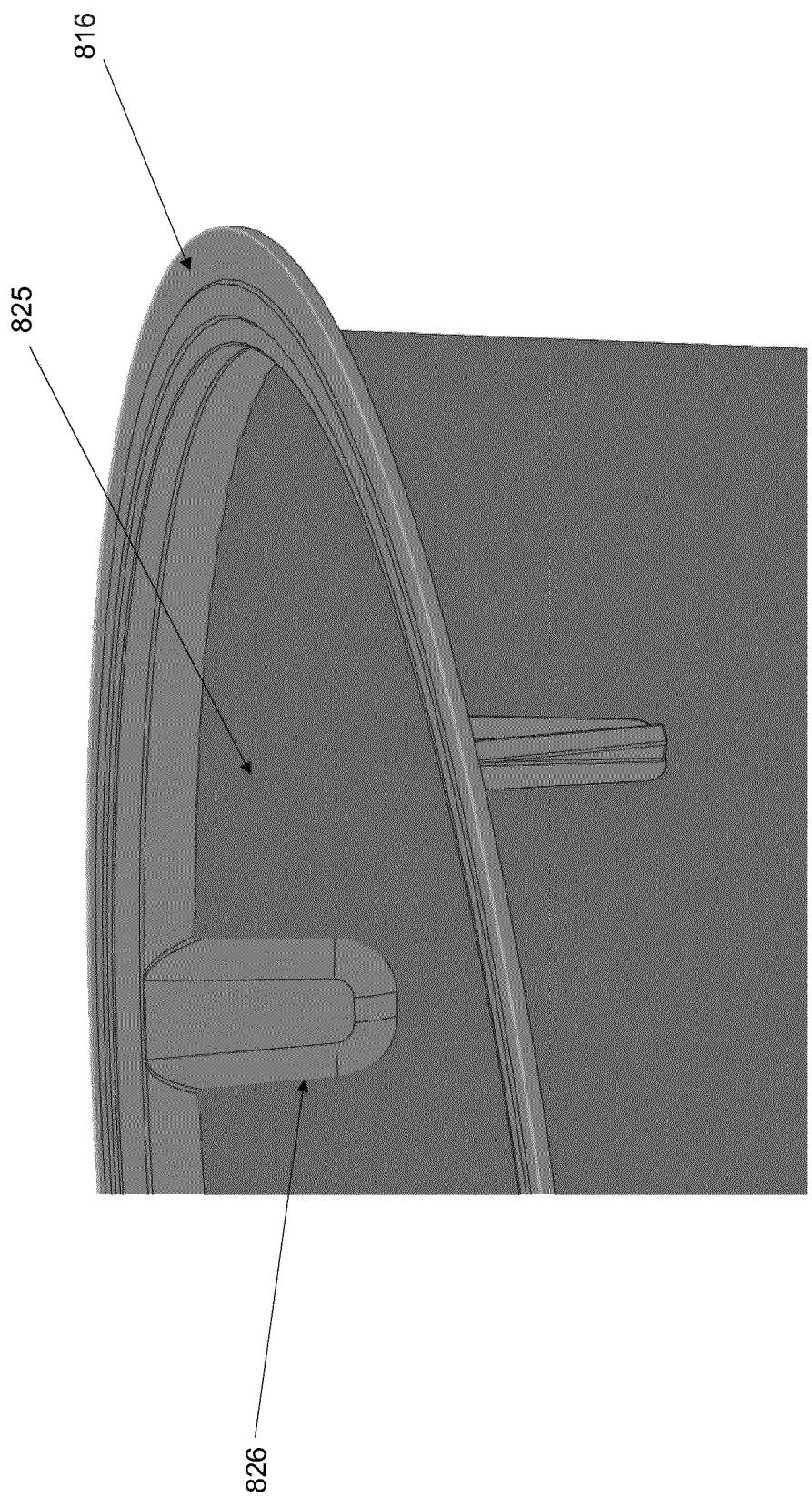
Figure 50C:
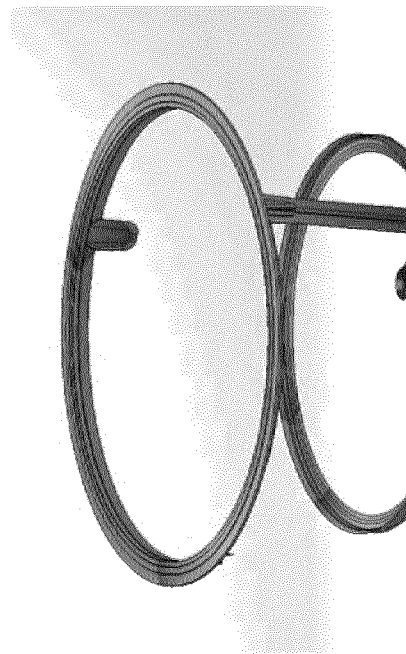
Figure 50D:
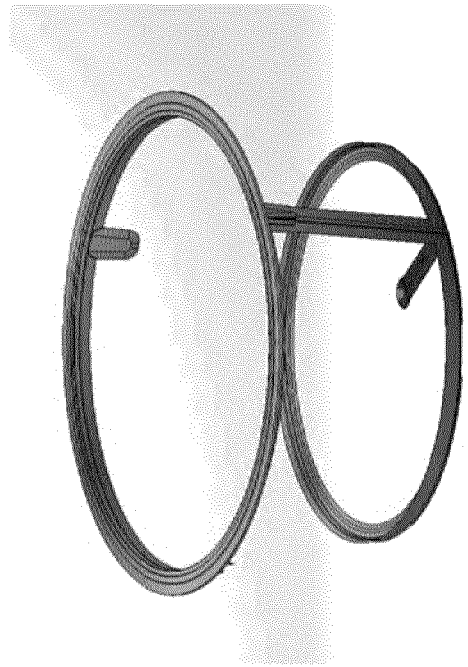
Figure 50A:
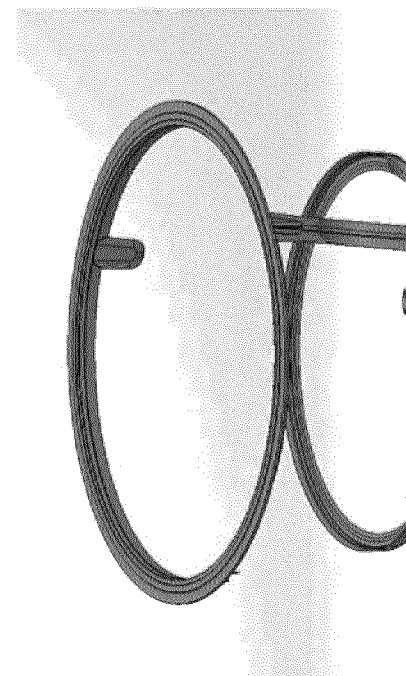
Figure 50B:
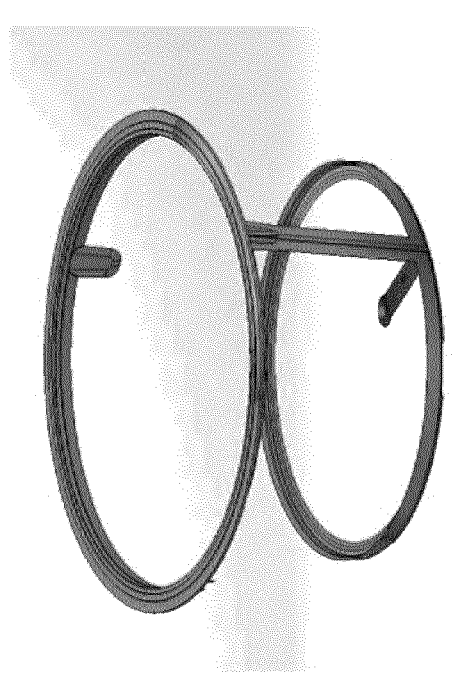
Figure 51:
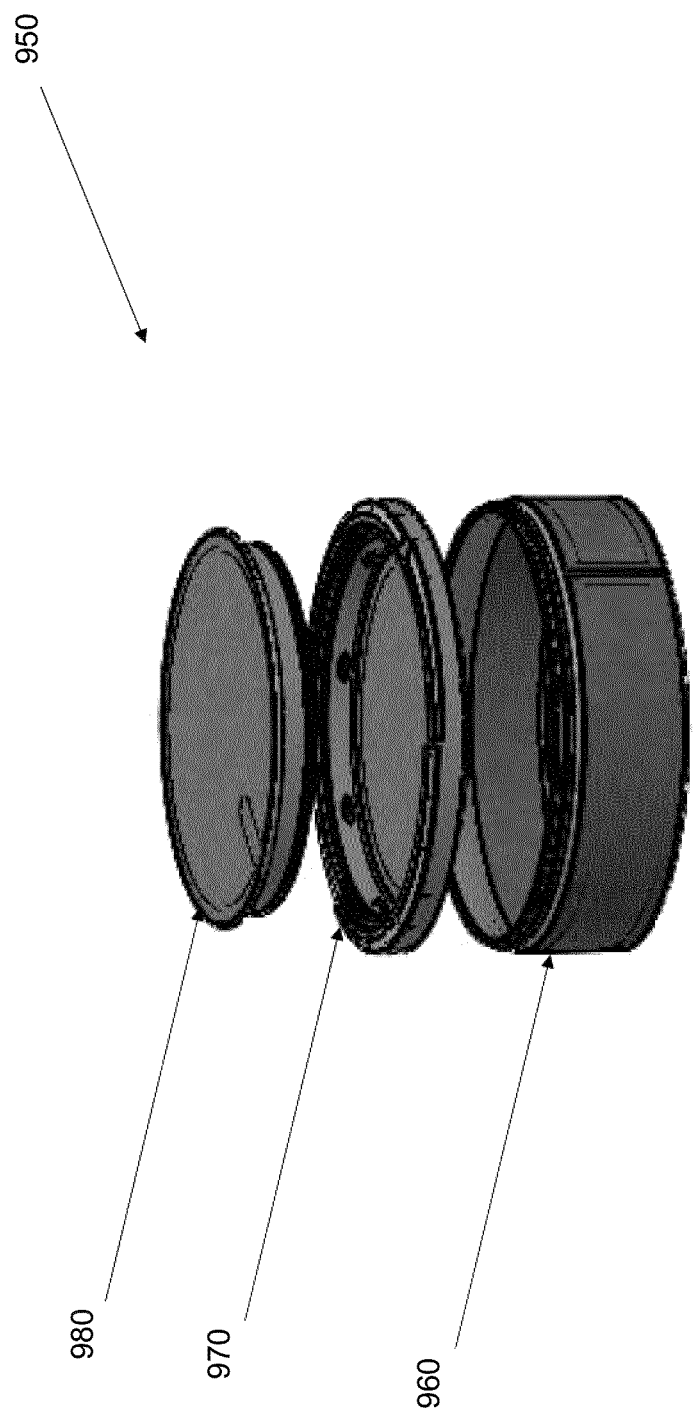
Figure 54:
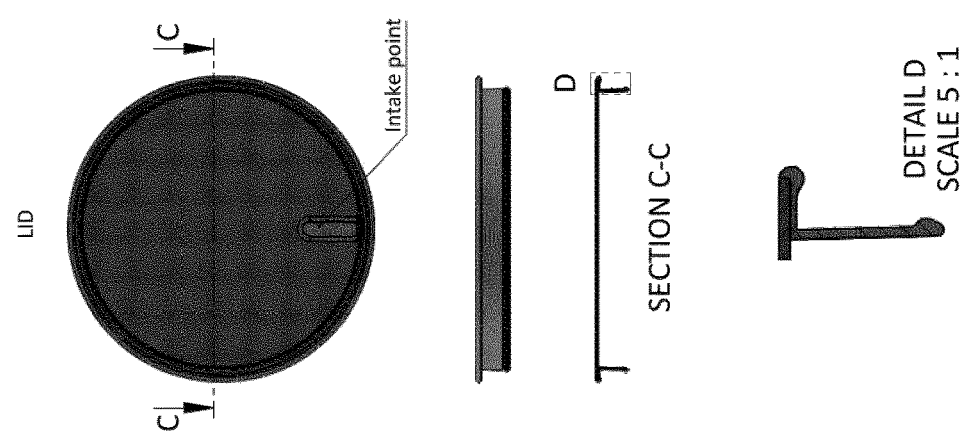
Figure 53:
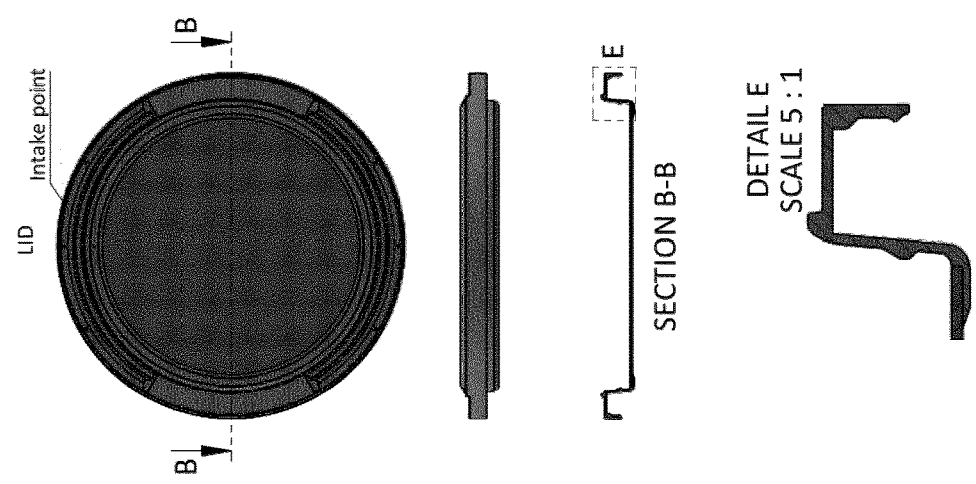
Figure 52:
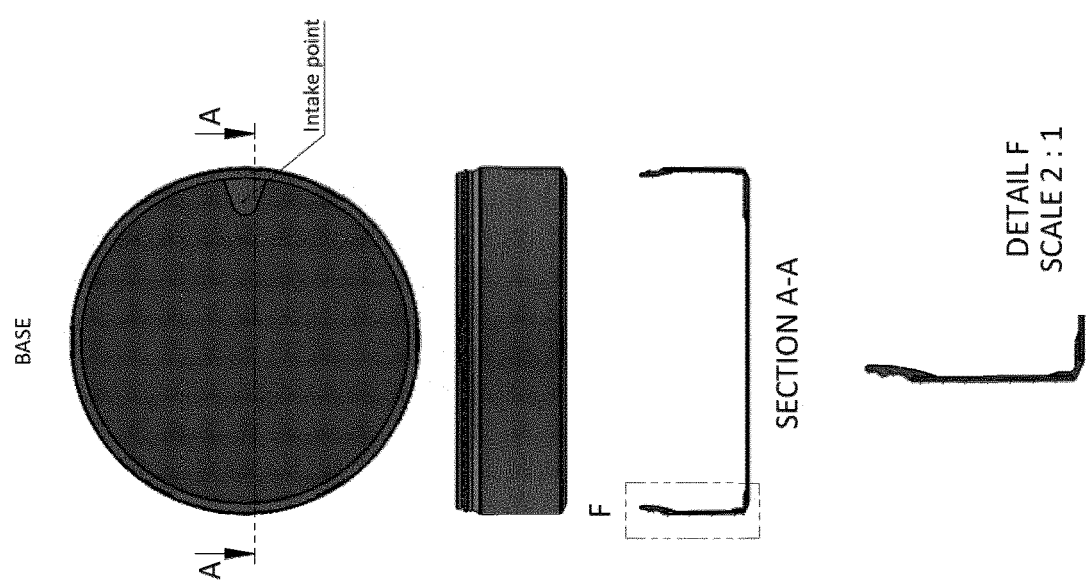
Figure 55:
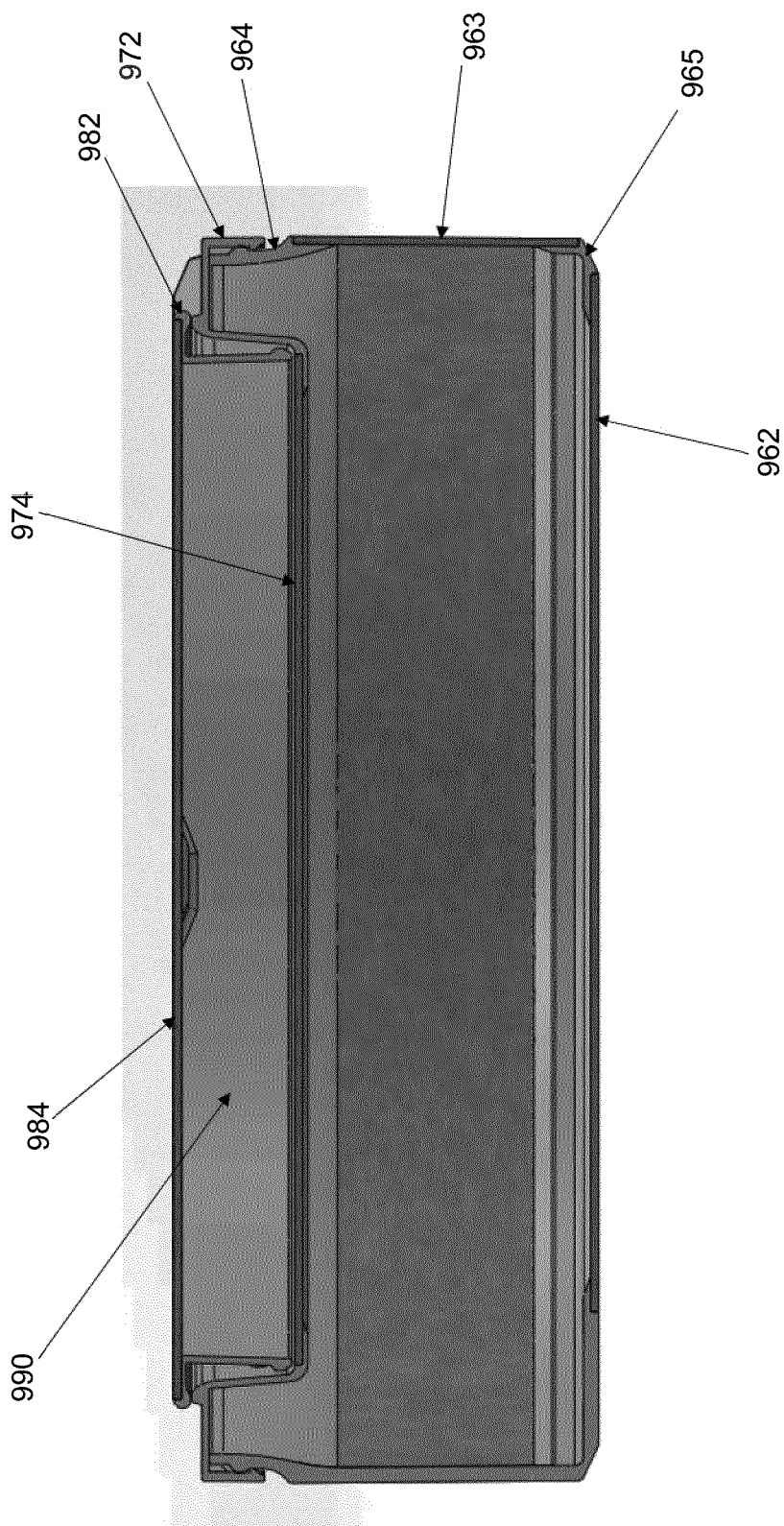
Figure 56:
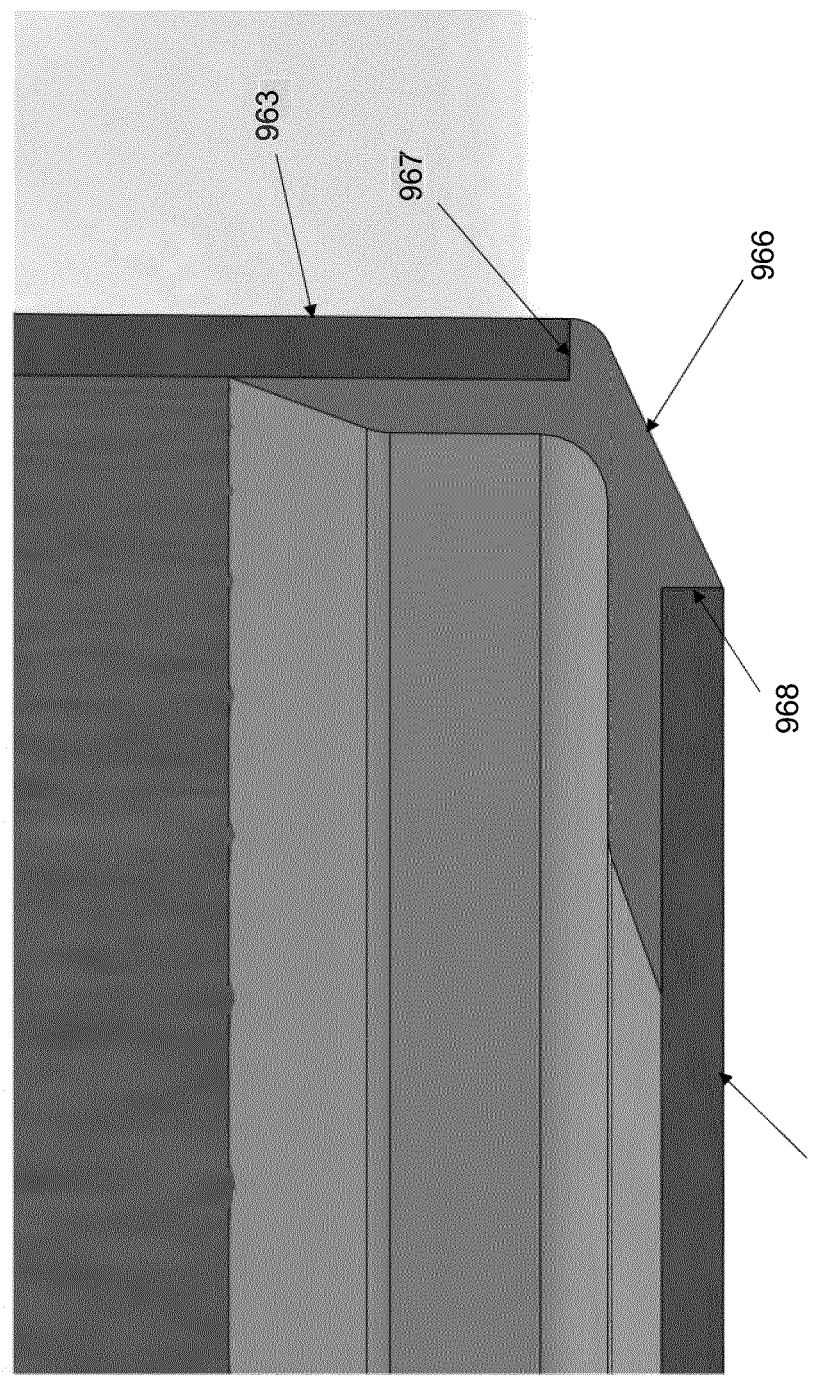
Figure 57:
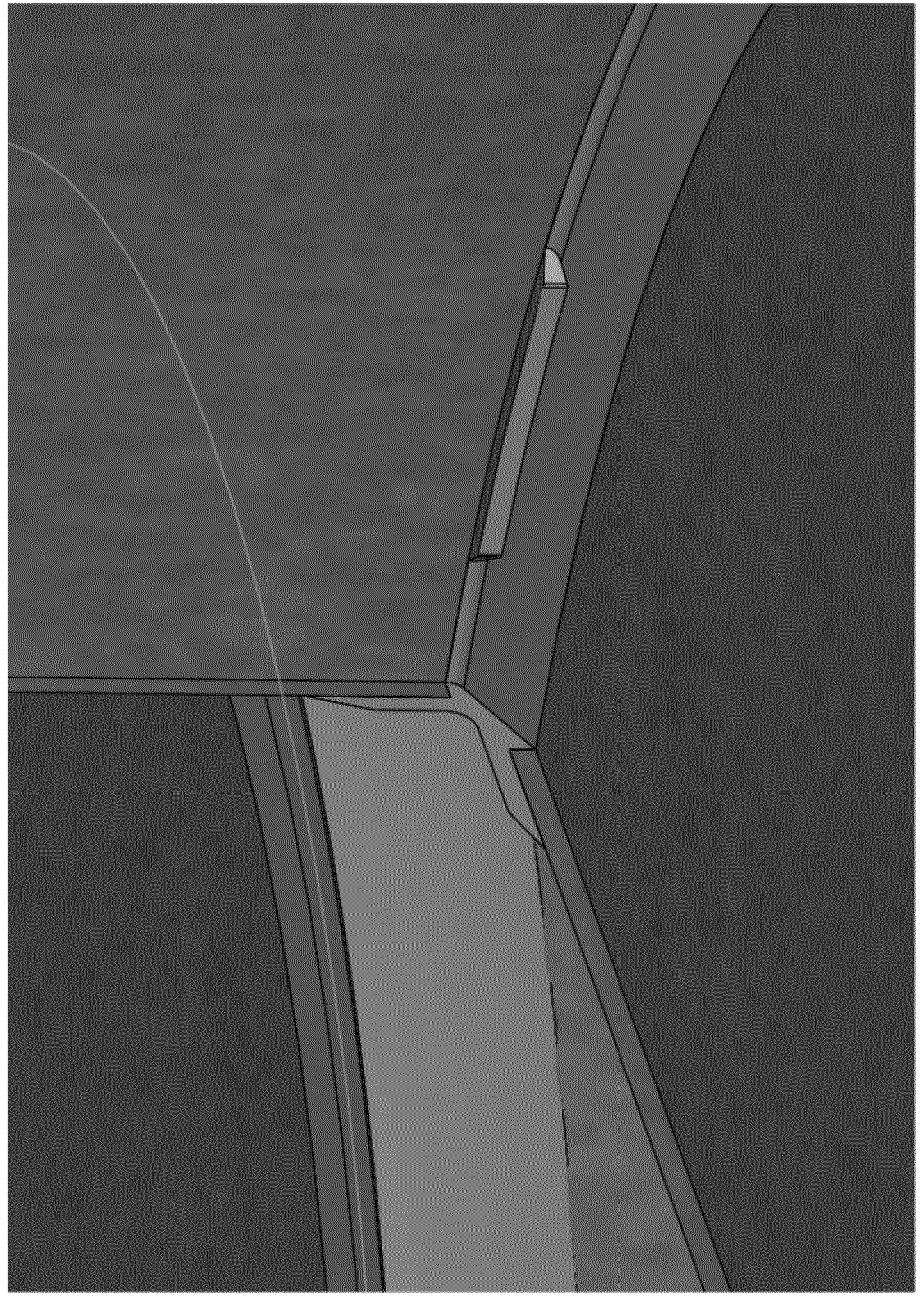

FIG. 49 shows the upper ring 816 of the package. The ring 816 is formed with depending tabs 826 which mould around notches in the sidewall.

FIGS. 50A to 50D show progressively the flow of plastic material during moulding. It will be noted that the stem includes a feeder channel, allowing material to flow from the lower 817 to the upper ring 816. Only one channel is provided between the rings in this embodiment.

FIGS. 51 to 58 illustrate a package 950 formed according to a further embodiment. The package 950 comprises base 960, a lid 970 and a sub-lid 980. The lid snap-fits/clips onto the base and the sub-lid snap-fits/clips into the lid. Other ways of connecting the parts together (e.g. screw thread formations, bayonet fixing means or the like) could be provided. A void 990 is formed between the lid and the sub-lid.

The base 960 comprises a bottom disc 962 formed from laminated cardboard, a generally cylindrical (in this embodiment) wraparound sidewall 963 formed from laminated cardboard and a moulded-on frame formed from a plastics material and having an upper part 964 and a lower part 965.

The lid 970 comprises an annular frame 972 formed from a plastics material and a disc-like 974 insert formed from laminated cardboard.

The sub-lid 980 comprises a plug-like frame 982 formed from a plastics material and a disc-like top deck 984 formed from laminated cardboard.

The package shares certain similarities with the packages shown in FIGS. 1 to 51, including exposed edges of laminated cardboard being covered by frame material. On the base, for example, the lower ring forms a corner (see especially FIGS. 56 and 57) against which the free edges of both the bottom disc and the sidewall abut. In this embodiment the exterior of the corner is formed as a chamfer 966 from which a radial step 967 projects (which is formed onto the exposed edge of the sidewall) and also an axial step 968 (which is formed onto the exposed edge of the bottom disc). For the bottom disc this means the lower surface is not raised but it is laminated/coated so it is protected from moisture ingress. Meanwhile the exposed edge of the base is protected by the chamfered corner.

Figure 58:
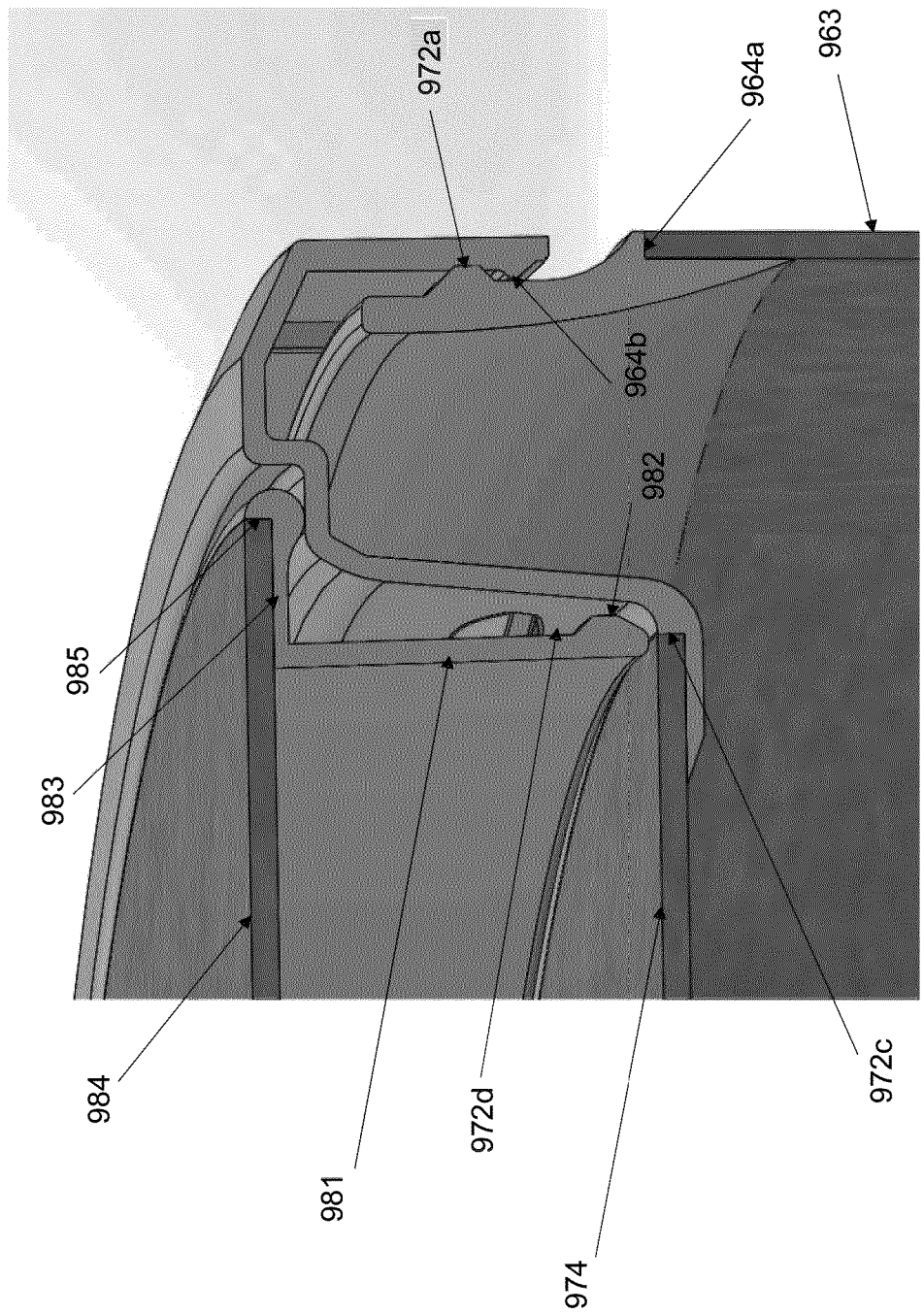
Figure 59C:
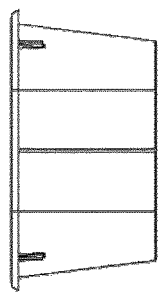
Figure 59F:
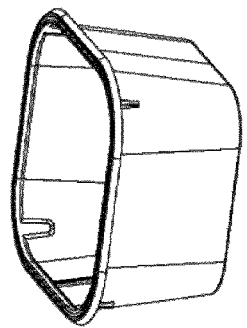
Figure 59B:
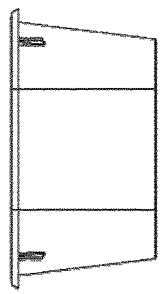
Figure 59E:
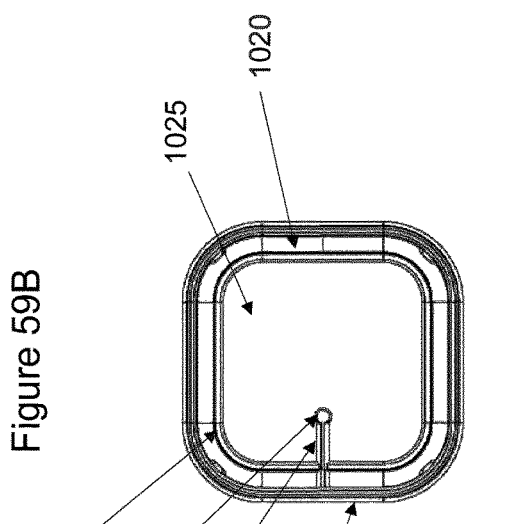
Figure 59A:
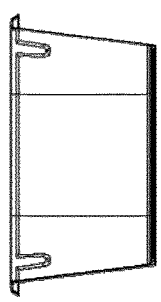
Figure 59D:
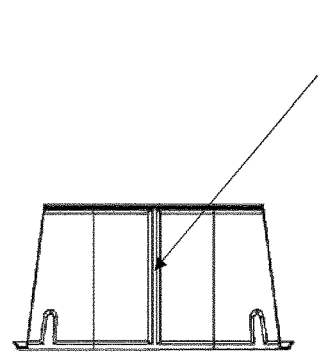
Figure 62:
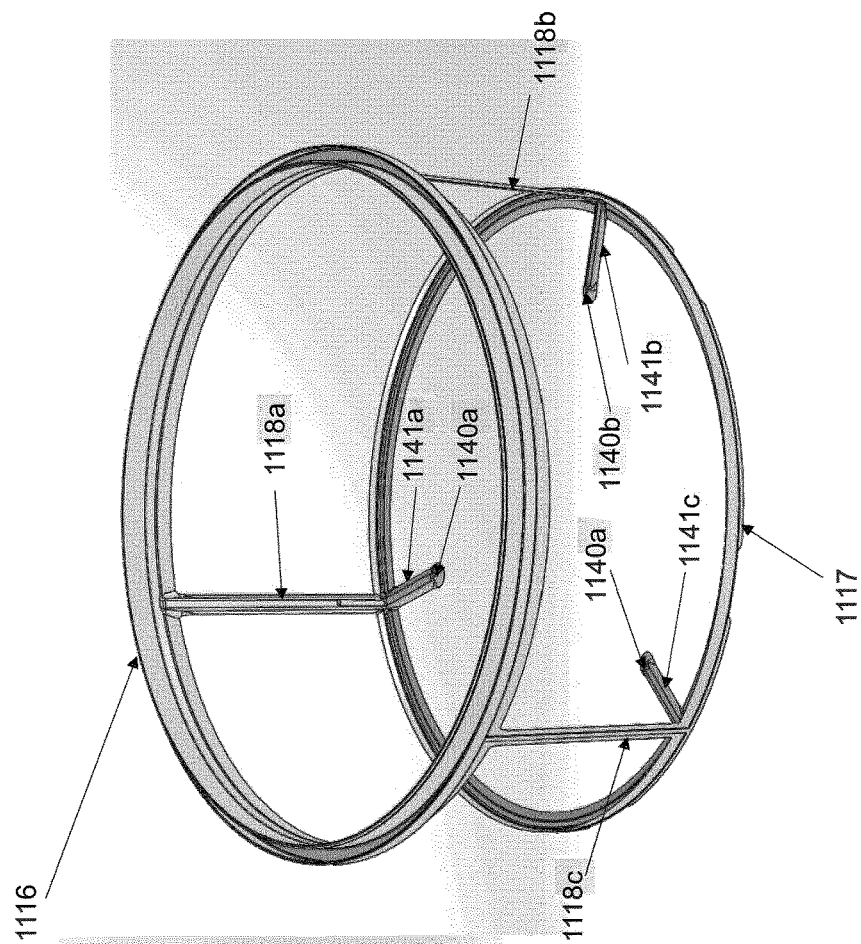

FIG. 58 shows the upper part of the base, the lid and the sub-lid.

The upper part 964 of the base includes a radial step 964a which is formed onto the sidewall 963. The upper part also includes an external annular snap bead 964b.

The lid frame 972 includes an internal snap bead 972a which cooperates with the bead 964b. At the other end of the frame an axial step 972c is formed onto the insert 974. The frame also includes an external snap bead 972d.

The frame of the sub-lid 980 is generally L-shape in section. A longer leg 981 terminates with a snap bead 982 which cooperates with the bead 972d. A shorter leg 983 terminates with an axial step 985 which is formed onto the exposed edge of the top deck 984.

In some embodiments the package is formed as a snuff box/chewing tobacco container. The void 990 can be used to store used tobacco, for example.

FIGS. 59A-F show a package 1010 formed according to a further embodiment. In this embodiment the package is generally square. Only a single limb 1040, a single injection inlet point 1041 and a single connecting stem 1018 is used to form lower and upper rings (which are curved squares), with the upper ring being larger than the lower ring.

Figure 61:
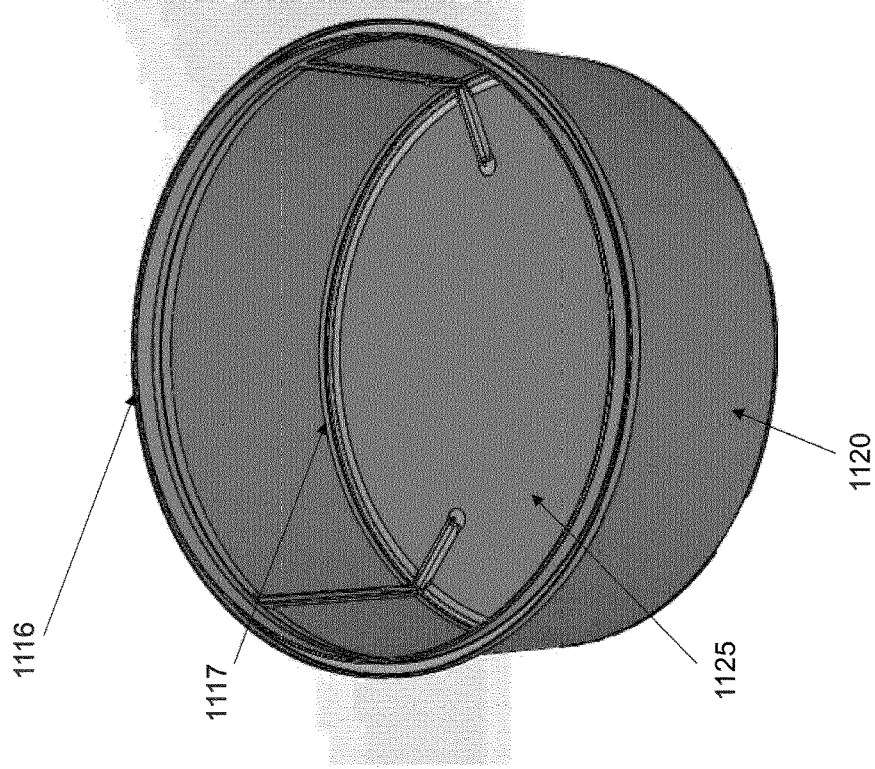
Figure 63:
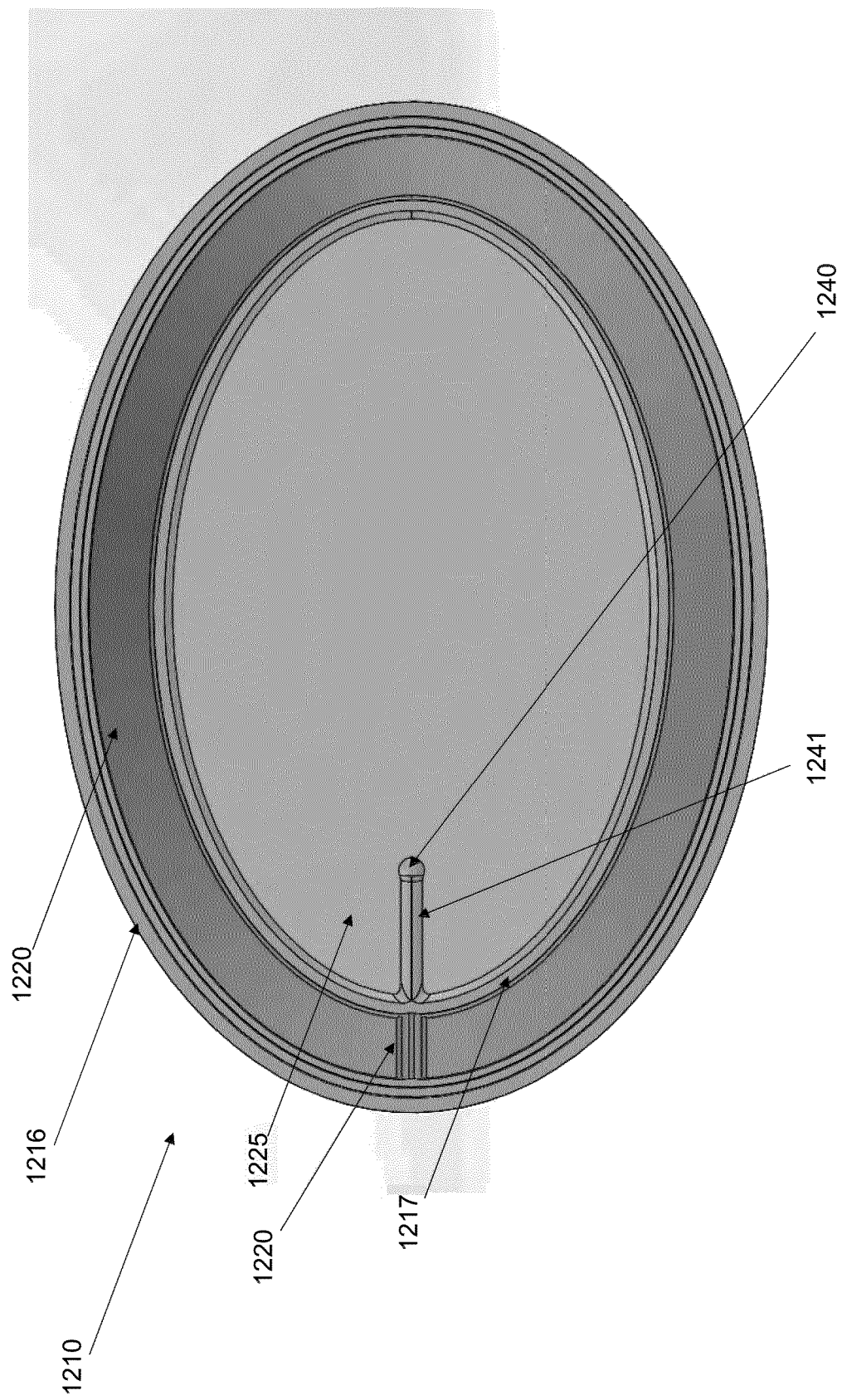

FIGS. 60 and 61 show a package 1110 formed according to a further embodiment. FIG. 63 shows the skeleton frame forming part of the package.

In this embodiment multiple (three, in this case) limbs 1141a-c are present, providing three separate corresponding inlet points 1140a-c and three corresponding stems 1118a-c used to form lower 1117 and upper 1116 rings.

Figures 64, 65:
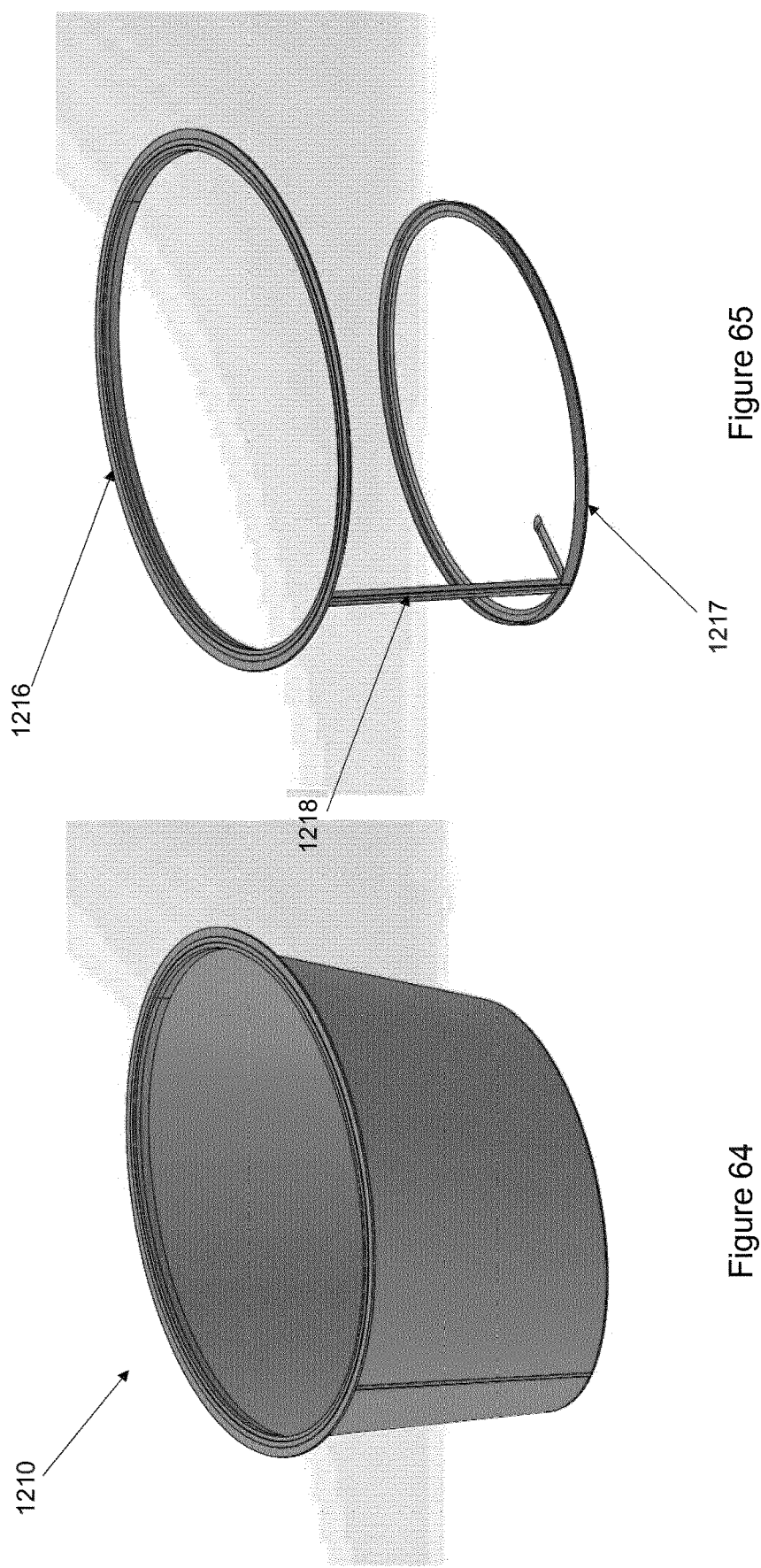
Figure 66:
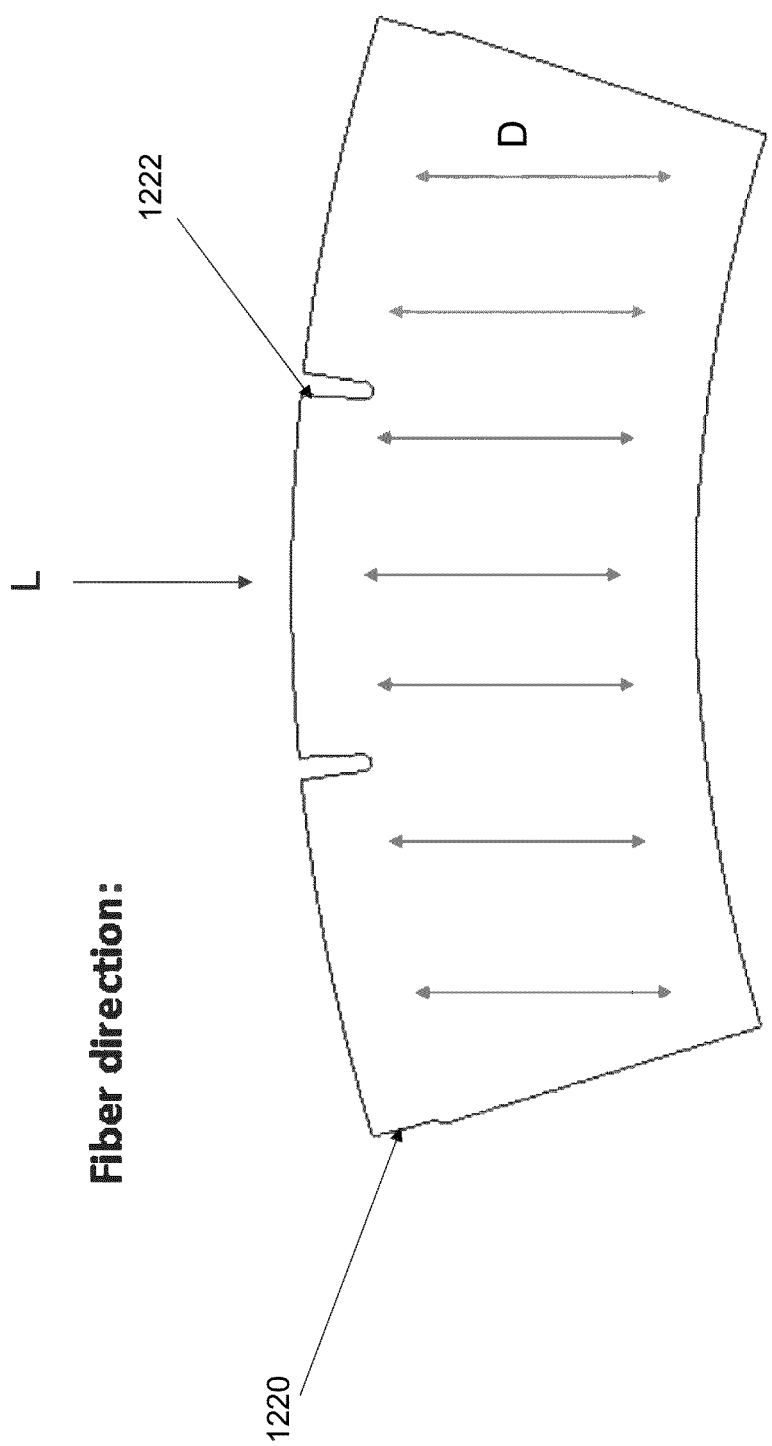

FIGS. 63 and 64 show a package 1210 formed according to a further embodiment. FIG. 66 shows the skeleton frame forming part of the package.

FIG. 66 shows a wraparound sidewall blank 1220 formed in accordance with the present invention. The blank is removed (e.g. cut/stamped/punched) from a stock sheet of fibre-based material. It will be noted that as a result the orientation D of the fibres can be controlled to be all the same. Further, it will be appreciated that if the sidewall is formed only by bending in a single plane, the uni-directional orientation of the fibres will be maintained in the final hybrid package. This means, for example, that the fibres can be oriented to provide a particular benefit. In some embodiments the sidewall fibres have a generally axial orientation, meaning that maximum stiffness is provided in a top load direction L.

Figure 67:
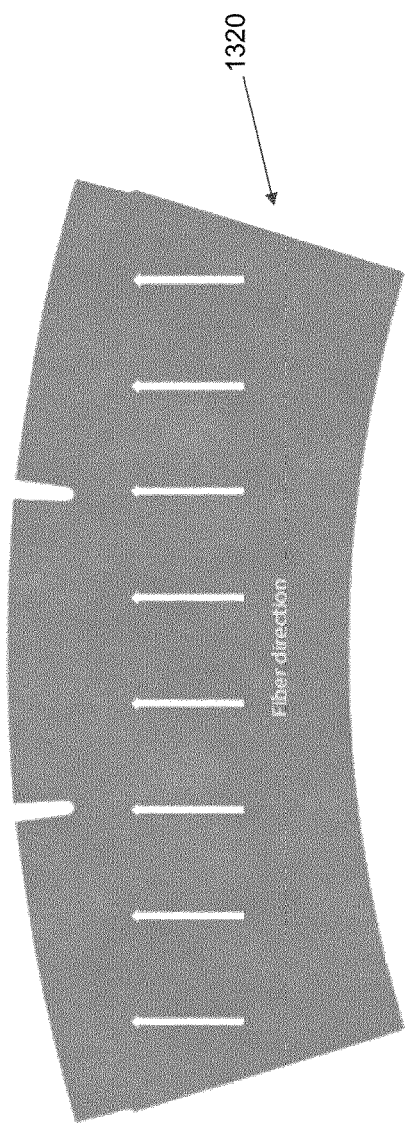

FIG. 67 shows a sidewall 1320 formed in accordance with the present invention. Unidirectional fibre orientation is illustrated.

Figure 68:
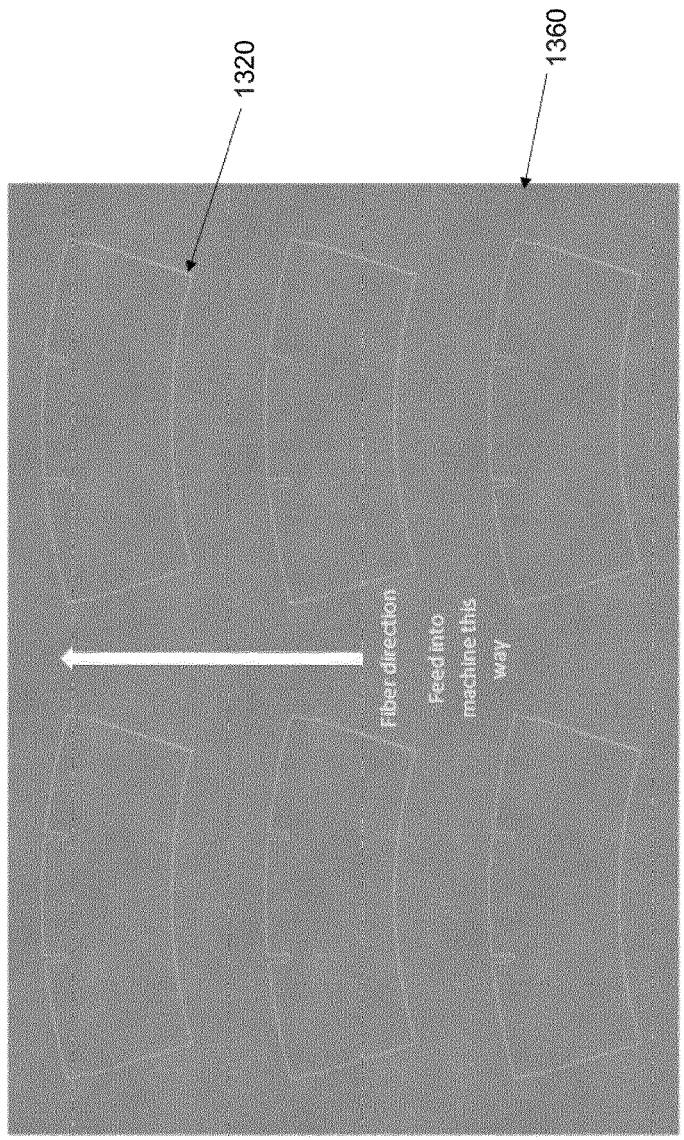

FIG. 68 shows a sheet 1360 of fibre-based material including a plurality of pre-cut sidewalls 1320.

Figure 70:
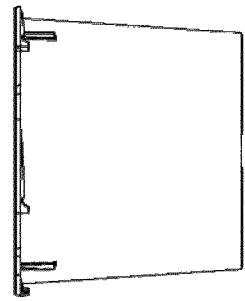
Figure 71:
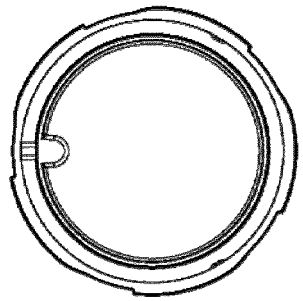
Figure 69:
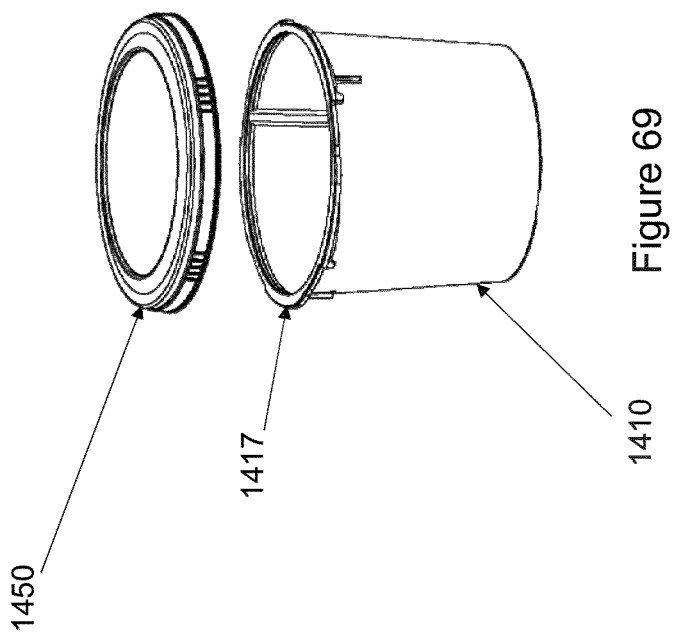

FIGS. 69 to 71 show a package formed according to the present invention. In this embodiment a container 1410 and a separate, removable lid 1450 are provided.

The package is formed with a twist lock closing system, with the upper ring and the lid being provided with cooperating formations and forming a generally bayonet style attachment. The lid is rotated to move locking formation/s (e.g. lug/s) either axially under or free of cooperating locking surfaces (e.g. flanges) on the ring to lock/unlock when positioned on the container.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A hybrid package comprising a wall formed from a paper or paper-based material and a frame formed from a plastics material, in which the frame includes a step which is positioned against a free edge of the wall, whereby one or more exposed edges of the wall are protected by the frame, wherein the frame includes a foot upon which the package rests in use, wherein the foot includes the step onto which the wall is received, wherein the step is formed by arcuate feet portions, and the arcuate feet portions are spaced by radially inwardly extending rims, and wherein the frame comprises an upper ring and a lower ring, and in which the rings are joined by a stem.

2. The package of claim 1, wherein all exposed edges of the wall are covered by the frame.

3. The package of claim 1, wherein the step is provided in the region of a frame corner.

4. The package of claim 1, wherein the wall is a wrap-around side sleeve and the package further comprises a base.

5. The package of claim 4, wherein the base comprises paper or paper-based material and/or plastic material.

6. The package of claim 1, further comprising a lid.

7. The package of claim 1, wherein the lower ring includes a radially inwardly extending part that allows formation of the frame using an off-centre injection point.

8. The package of claim 1, wherein the upper ring has a larger diameter than the lower ring.

9. The package of claim 1, wherein the wall is formed as a flat blank that is foldable into a final form.

10. The package of claim 9, wherein the wall is folded only about a central axis of the frame.

11. The package of claim 9, wherein the wall is formed from a fibre-based material, in which there is generally uni-directional orientation of fibres in the blank and in which that uni-directional orientation is maintained in the final form.

12. The container of claim 1, wherein the arcuate feet portions extend radially outward away from the radially inwardly extending rims.

13. The container of claim 1, wherein the wall extends circumferentially across the arcuate feet portions and the radially inwardly extending rims.

14. The container of claim 1, wherein the upper ring and the lower ring are circular.

15. The container of claim 1, wherein the upper ring and the lower ring are non-circular.

16. The container of claim 1, wherein the upper ring and the lower ring are rectangular.

17. The container of claim 1, wherein the upper ring and the lower ring are oval in shape.

18. The container of claim 1, wherein the upper ring and the lower ring are square in shape.

19. A mixed material package comprising an injection moulded polypropylene skeleton, a paperboard wraparound side sleeve, and a paperboard base, wherein the skeleton includes a foot upon which the package rests in use, wherein the foot includes a step onto which the paperboard wraparound side sleeve is received, wherein the step is formed by arcuate feet portions, and the arcuate feet portions are spaced by radially inwardly extending rims, and wherein the skeleton comprises an upper ring and a lower ring, and in which the rings are joined by a stem.

20. The package of claim 19, further comprising a lid.

21. The package of claim 20, wherein the lid comprises a polypropylene frame and a paperboard deck.

22. The package of claim 20, further comprising a sub-lid which is attached or attachable to the lid.

23. The package of claim 22, wherein a void is formed between the lid and the sub-lid.

24. A method of forming a hybrid package comprising: providing a wall formed from a paper or paper-based material; inserting the wall into a mould; and injection overmoulding a frame onto the wall, wherein the frame includes a foot upon which the package rests in use, wherein the foot includes a step onto which the wall is received, wherein the step is formed by arcuate feet portions, and the arcuate feet portions are spaced by radially inwardly extending rims, and wherein the frame comprises an upper ring and a lower ring, and in which the rings are joined by a stem.

* * * * *